US011404215B2

(12) United States Patent
Gomez et al.

(10) Patent No.: US 11,404,215 B2
(45) Date of Patent: Aug. 2, 2022

(54) CAPACITOR

(71) Applicant: TDK Electronics AG, Munich (DE)

(72) Inventors: Manuel Gomez, Coin (ES); Fernando Rodriguez, Malaga (ES); Tomas Wagner, Malaga (ES); David Pelaez, Torremolinos (ES)

(73) Assignee: TDK ELECTRONICS AG, Munich (DE)

( * ) Notice: Subject to any disclaimer, the term of this patent is extended or adjusted under 35 U.S.C. 154(b) by 60 days.

(21) Appl. No.: 16/765,436

(22) PCT Filed: Nov. 21, 2018

(86) PCT No.: PCT/EP2018/082099
§ 371 (c)(1),
(2) Date: May 19, 2020

(87) PCT Pub. No.: WO2019/101802
PCT Pub. Date: May 31, 2019

(65) Prior Publication Data
US 2020/0328032 A1    Oct. 15, 2020

(30) Foreign Application Priority Data

Nov. 21, 2017    (ES) .............................. ES201731345
Feb. 13, 2018    (DE) ......................... 102018103166.1

(51) Int. Cl.
*H01G 4/32*        (2006.01)
*H01G 4/30*        (2006.01)
(Continued)

(52) U.S. Cl.
CPC ................ *H01G 4/32* (2013.01); *H01G 4/30* (2013.01); *H01G 4/40* (2013.01); *H02G 5/02* (2013.01)

(58) Field of Classification Search
CPC .. H01G 4/30; H01G 4/33; H01G 4/40; H10G 4/32; H02G 5/02
(Continued)

(56) References Cited

U.S. PATENT DOCUMENTS 5,923,523 A    7/1999  Herbert
7,907,385 B2   3/2011  Korich et al.
(Continued)

FOREIGN PATENT DOCUMENTS

CN    101630847 A    1/2010
CN    202384178 U    8/2012
(Continued)

OTHER PUBLICATIONS

"Technical Questions and Answers for Power Transmission Lines", National Power Corporation East China Company, Jan. 2003, 4 pages.
(Continued)

*Primary Examiner* — Arun Ramaswamy
(74) *Attorney, Agent, or Firm* — Slater Matsil, LLP

(57) ABSTRACT

A capacitor is disclosed. In an embodiment a capacitor includes at least two winding elements, a first busbar and a second busbar, wherein the first busbar and the second busbar connect the winding elements in parallel to each other, and wherein the first busbar and the second busbar are arranged such that they overlap each other.

28 Claims, 32 Drawing Sheets

(51) Int. Cl.
   *H01G 4/40* (2006.01)
   *H02G 5/02* (2006.01)

(58) Field of Classification Search
   USPC .......... 361/330, 530, 531, 541, 816, 301.5, 361/306.1, 306.3, 328
   See application file for complete search history.

(56) References Cited

U.S. PATENT DOCUMENTS

| | | | |
|---|---|---|---|
| 9,107,319 | B2 | 8/2015 | Jeong et al. |
| 9,241,413 | B2 | 1/2016 | Guerin et al. |
| 9,570,729 | B2 | 2/2017 | Schmidt et al. |
| 10,535,464 | B2 | 1/2020 | Kikuchi |
| 2001/0039150 | A1 | 11/2001 | Saito et al. |
| 2011/0149472 | A1 | 6/2011 | Yang et al. |
| 2011/0228508 | A1 | 9/2011 | Inuduka et al. |
| 2015/0213952 | A1* | 7/2015 | Horowy ............... H01G 2/06 361/306.3 |
| 2017/0256361 | A1 | 9/2017 | Yang et al. |

FOREIGN PATENT DOCUMENTS

| | | |
|---|---|---|
| CN | 103871744 A | 6/2014 |
| CN | 103988338 A | 8/2014 |
| CN | 104335689 A | 2/2015 |
| CN | 104465082 A | 3/2015 |
| CN | 105529188 A | 4/2016 |
| CN | 206200325 U | 5/2017 |
| DE | 102011007315 A1 | 10/2012 |
| EP | 2234129 A2 | 9/2010 |
| JP | 2001076967 A | 3/2001 |
| JP | 200861282 A | 3/2008 |
| JP | 2009289967 A | 12/2009 |
| JP | 2011023496 A | 2/2011 |
| JP | 2011258848 A | 12/2011 |
| JP | 2013161864 A | 8/2013 |
| JP | 2016134275 A | 7/2016 |
| JP | 2017011056 A | 1/2017 |
| KR | 101436787 B1 | 9/2014 |
| WO | WO-2017081853 A1 * | 5/2017 ............ H01G 4/224 |
| WO | 2017159672 A1 | 9/2017 |

OTHER PUBLICATIONS

Y. Li, et al., "Photovoltaic Module Manufacturing Technology", Beijing University of Posts and Telecommunications Press, Aug. 2017, 7 pages.

* cited by examiner

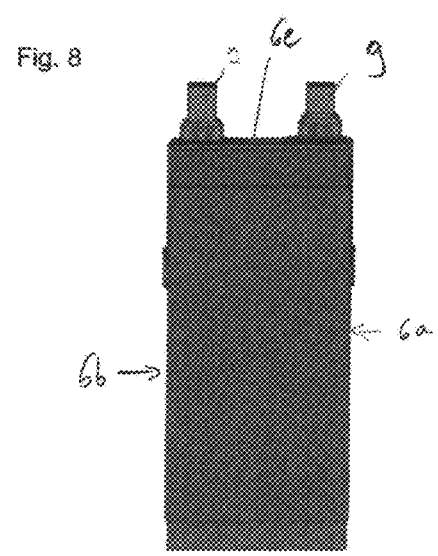
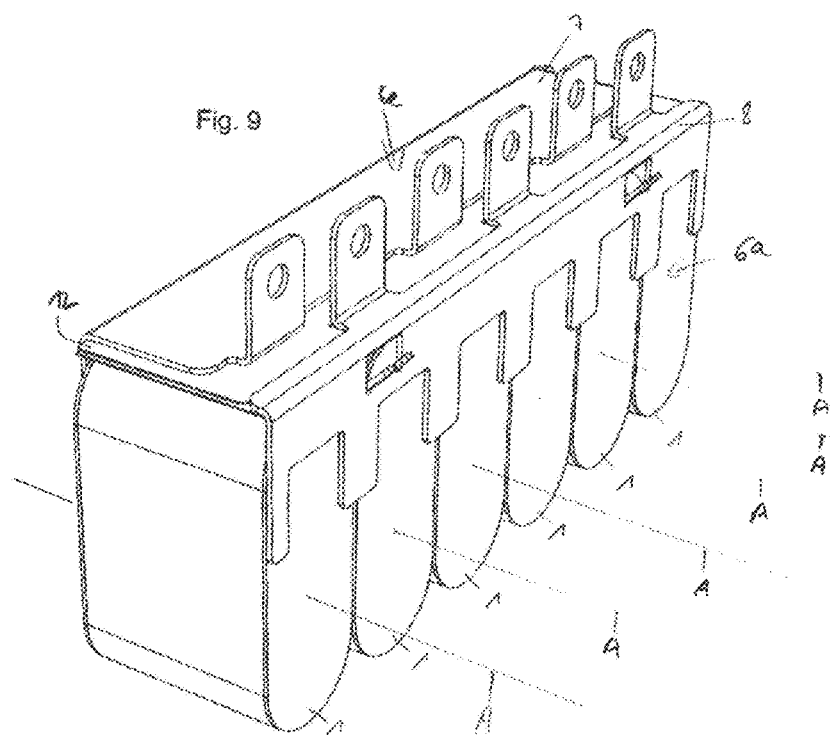

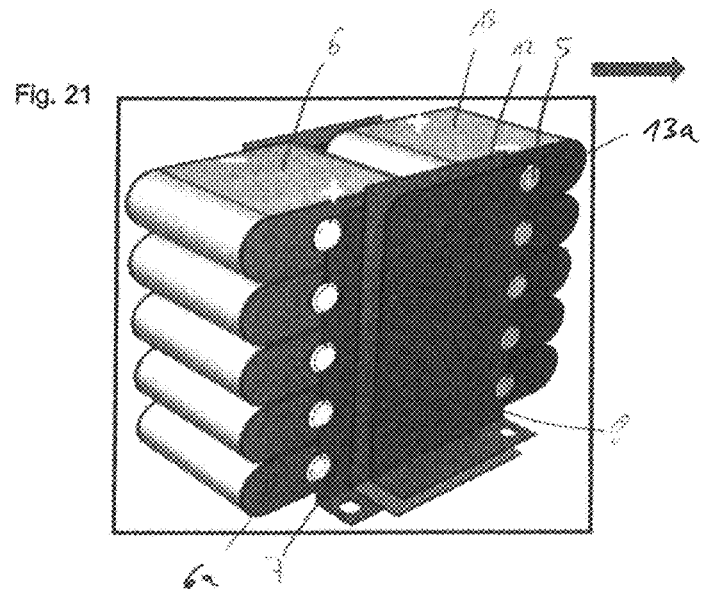
Fig. 21
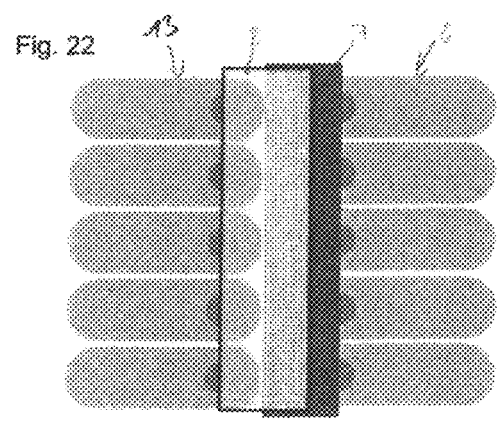
Fig. 22
Fig. 23
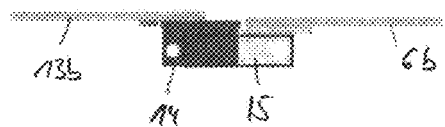

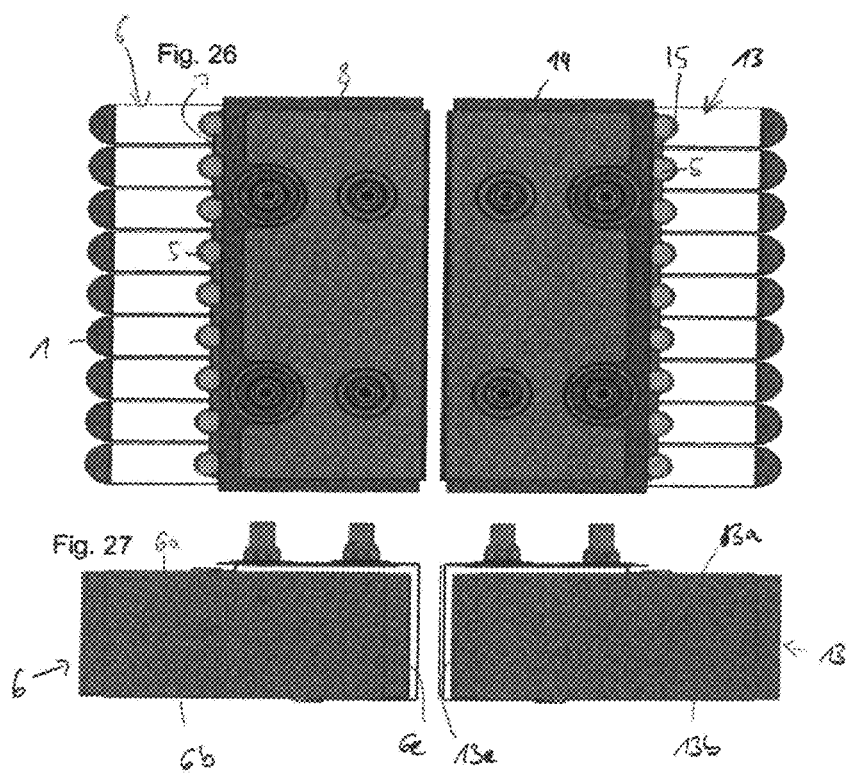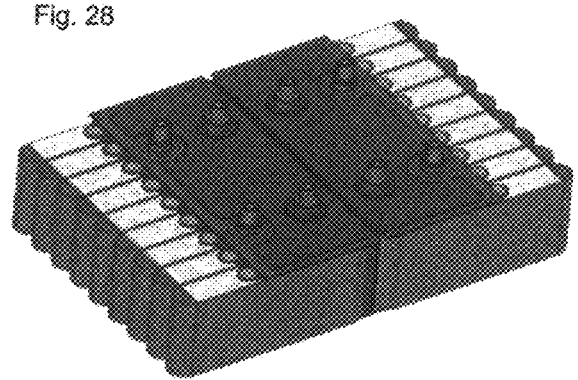

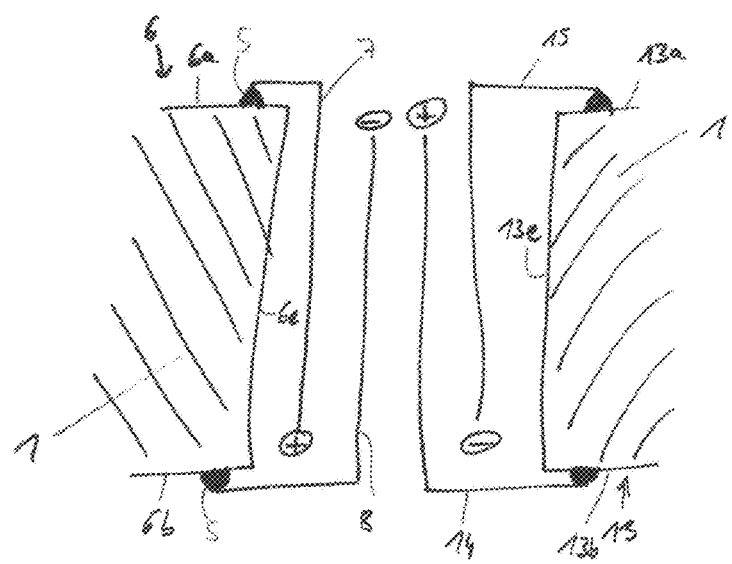

CAPACITOR

This patent application is a national phase filing under section 371 of PCT/EP2018/082099, filed Nov. 21, 2018, which claims the priority of German patent application 102018103166.1, filed Feb. 13, 2018, which claims the priority of Spanish patent application 201731345, filed Nov. 21, 2017, each of which is incorporated herein by reference in its entirety.

TECHNICAL FIELD

The present invention concerns a capacitor. In particular, the capacitor may be a metallized DC-link film capacitor.

BACKGROUND

Metallized film DC-Link capacitors are critical components for many power electronics applications: renewable energies, electric vehicles, traction, motor drives, uninterruptible power supply, energy transmission, etc.

DC-Link capacitor requirements strongly depend on the parameters of a semiconductor implemented in a converter connected to the capacitor and a modulation strategy of the converter.

The development of Wide-bandgap semiconductors (WBGS), to higher on-state voltage, has changed the characteristics of high power converters: higher switching frequencies, higher harmonic frequencies, lighter cooling systems, higher power density, more compact designs, etc.

As a consequence, in order to work correctly in such applications, the capacitor should be able to be operated at high frequencies, e.g., frequencies above 10 kHz, without too many losses due to parasitic inductances and resistances.

In power conversion, when AC is converted to low voltage DC, or AC from one frequency to another, the AC is usually rectified and smoothed. Once this is accomplished, the power is then routed to an inverter to obtain the final output. The DC that is fed into the inverter is called the DC link. As the name implies, the two sources are linked together with a filter capacitor which is called DC link capacitor.

In electric vehicle applications, the DC link capacitor is used as a load-balancing energy storage device. The DC link capacitor is placed between the DC, i.e., the battery, and the AC, i.e., a load side, of a voltage inverter.

SUMMARY

Embodiments provide an improved capacitor, for example, a capacitor that does not suffer many losses due to parasitic inductances and resistances at high switching frequencies.

A capacitor is provided that comprises at least two winding elements, a first busbar and a second busbar, wherein the first busbar and the second busbar connect the winding elements in parallel to each other and wherein the first busbar and the second busbar are arranged such that they overlap each other.

A winding element may be a capacitance unit. Each winding element of the capacitor may have the same capacitance. Each winding element may have a first pole of a first polarity, e.g., a positive polarity, and a second pole of a second polarity, e.g., a negative polarity. By applying a voltage between the first and the second pole, energy may be stored in the winding element.

A busbar may be a metallic strip or a metallic bar configured for local high current power distribution.

Due to the overlap of the first busbar and the second busbar, a capacitor is provided which has a characteristic that is well suited for power applications with voltages above 600 V and switching frequencies of more than 10 kHz. When a current flows through the first busbar, a magnetic field is generated by the current. Further, when a current flows through the second busbar, another magnetic field is generated by this current. Due to the overlap of the busbars, the magnetic fields have opposite orientations and, therefore, weaken or even cancel each other. Thus, overall, only a very weak magnetic field may be generated, when a voltage is applied to the first busbar and the second busbar. This results in a small inductance of the connection of the busbars and between the winding elements. Thus, the inductance of the capacitor may also be very small.

A small inductance between the winding elements is important for a power capacitor as a high inductance would result in resonance effects and high losses due to parasitic inductances and resistances.

Overall, homogeneous impedance can be provided by each winding element having the same capacitance and by each connection from a terminal to a winding element having the same inductance. Due to design requirements, it may not always be possible to provide the same inductance for each winding element. Thus, instead of trying to adapt the inductances to each other, it is proposed to reduce the inductances to minimal values by cancelling or weakening the magnetic fields.

A capacitor with a first and a second busbar overlapping each other may have a low equivalent series resistance (ESR), a frequency-stable ESR, a homogeneous ESR for each winding element, a low equivalent series inductance (ESL), a homogeneous ESL for each winding element and a homogeneous internal current distribution. Internal resonances may be avoided.

The first busbar and the second busbar may be arranged such that at least 50% of the area of the first busbar is overlapped by the second busbar. The larger the overlap between the busbars, the better is the weakening or cancelling of the magnetic fields. Preferably, the first busbar and the second busbar are arranged such that at least 70% of the area of the first busbar is overlapped by the second busbar. Even more preferably, the first busbar and the second busbar are arranged such that at least 90% of the area of the first busbar is overlapped by the second busbar.

In the area of the overlap of the busbars, a thin isolator may be arranged between the busbars which prevents a short circuit between the busbars. The thin isolator may not significantly influence the magnetic fields.

The first busbar and the second busbar may be arranged such that a current flowing through the first busbar generates a first magnetic field and a current flowing through the second busbar generates a second magnetic field, wherein the first magnetic field and the second magnetic field compensate each other. The compensation of the magnetic fields may result in a low inductance and homogeneous impedance for all the winding elements. Thus, the capacitor may not show any resonance effects even when operated at switching frequencies above 10 kHz.

Each winding element may have a positive pole and a negative pole, wherein the first busbar is connected either to the positive pole of each winding element or to the negative pole of each winding element. The second busbar may be connected to the respective other of the positive pole of each winding element or the negative pole of each winding element. The busbars may be configured such that currents of opposite polarity flow in the busbars.

In one embodiment, the capacitor comprises a fifth busbar and a sixth busbar. The first busbar and the second busbar are arranged on a side of the stack and the fifth and the sixth busbar are arranged on a side of the stack opposite to the side at which the first busbar and the second busbar are arranged. The fifth busbar is connected to the same poles as the first busbar and the sixth busbar is connected to the same poles as the second busbar.

The first and the second busbar may be arranged on a lateral side of the stack which has a surface normal perpendicular to a stacking direction of the stack. The fifth busbar and the sixth busbar may be arranged on a lateral side opposite to the lateral side on which the first and the second busbar are arranged and which also has a surface normal perpendicular to the stacking direction.

The arrangement of the fifth and sixth busbar opposite to the first and second busbar may result in a symmetric coupling of currents into the winding elements. In particular, for each winding element, the first and the fifth busbar may be connected to one pole of the winding element at two positions being symmetric with respect to each other and the second and sixth busbar may be connected to the other pole of the winding element at two positions being symmetric with respect to each other.

Moreover, as current may be coupled to each pole of the winding element by two busbars, i.e., the first and the fifth busbar and, respectively, the second and the sixth busbar, the capacitor may be particularly suited for high current applications.

The at least two winding elements may be arranged in a stack, wherein the first busbar and the second busbar are arranged at a lateral face of the stack. The lateral face of the stack may be a face that is perpendicular to a top face and a bottom face of the stack, wherein metallizations and connection elements for contacting the winding element are arranged on the top face and the bottom face of the winding elements. The top face of the stack may be formed by the top faces of the winding elements. The bottom face of the stack may be formed by the bottom faces of the winding elements.

The at least two winding elements may be arranged in a stack, wherein the first busbar and the second busbar are arranged on at least two faces of the stack. In particular, the first and the second busbar may completely or partly cover one or more lateral faces, and/or the top face and/or the bottom face of the stack.

All winding elements may be arranged in a single stack. The stack may comprise more than two winding elements.

In a stacking direction, the first busbar may be alternatingly connected to a top face of one winding element and to a bottom face of the next winding element. In the stacking direction, the second busbar may be alternatingly connected to a bottom face of one winding element and to a top face of the next winding element. Accordingly, the top face of each winding element is connected either to the first busbar or to the second busbar and the bottom face of each winding element is also connected either to the first busbar or the second busbar.

In the stack, the top faces of each winding element may face in the same direction. The bottom face of each winding element may be opposite to the top face of the winding element. The top faces of the winding elements may form the top face of the stack. The bottom faces of the winding elements may form the bottom face of the stack that is opposite to the top face of the stack.

In this embodiment, the windings are connected to both busbars in an alternate way. Thereby, the polarities of the winding elements alternate along the stacking direction. In other words, in the stacking direction, each winding element has an opposite polarity compared to the adjacent winding element.

As a result, the magnetic flux may be compensated in all connections, including the connection between winding elements. This may result in only very small parasitic inductances and resistances between winding elements and between winding elements and terminals. By reducing the parasitic inductances and resistances, the impedance from the terminals to each winding is more homogeneous between the winding elements for each frequency in the bandwidth in which the capacitor may be operated. Thus, the performance of the capacitor in the complete bandwidth is better due to a low and frequency stable ESR, an homogeneous ESR from each pair of terminals, a low and homogeneous ESL from each pair of terminals, an homogeneous internal current distribution and the avoidance of internal resonances.

In an alternative embodiment, the first busbar may be connected to a top face of each of the winding elements, and the second busbar may be connected to a bottom face of each of the winding elements.

The capacitor may comprise at least four winding elements, wherein at least two winding elements are arranged in a first stack and at least two winding elements are arranged in a second stack. The winding elements may be arranged in the first stack and, respectively, in the second stack such that the top face of the first stack has a polarity opposite to the polarity of the top face of the second stack. This arrangement of the winding elements in the stack may ensure that a current flows in an opposite direction in the overlapping busbars.

The first busbar and the second busbar may be arranged between the first stack and the second stack. This may facilitate contacting the first busbar and the second busbar to both of the first stack and the second stack.

The first busbar may have a larger thickness in a section between the stacks than in a section overlapping a top face or a bottom face of the winding elements. The second busbar may have a larger thickness in a section between the stacks than in a section overlapping a top face or a bottom face of the winding elements. The larger thickness between the stacks results in a high current capability of the capacitor. The low thickness in the sections overlapping the top or bottom faces ensures that the busbars can easily be fixed to the winding elements by welding.

The first busbar may be folded in the section between the stacks and/or the second busbar may be folded in the section between the stacks. The fold may be formed by a 180° turn of the respective busbar.

The winding elements may be arranged in the first stack and, respectively, in the second stack such that a top face of the first stack has a polarity opposite to the polarity of a top face of the second stack.

The first busbar may be connected to the top faces of the winding elements in the first stack and to the bottom faces of the winding elements in the second stack. The second busbar may be connected to the bottom faces of the winding elements in the first stack and to the top faces of the winding elements in the second stack. Thereby, it can be ensured that each winding element of the first stack is arranged adjacent to a winding element of the second stack which is inverted in its polarity with respect to the winding element of the first stack.

The first busbar may be arranged on the top face of the first stack and on the top face of the second stack and connected to the top faces of the winding elements in the first stack. The second busbar may be arranged on the top face of the first stack and on the top face of the second stack and connected to the top faces of the winding elements in the second stack. Accordingly, both of the first busbar and the second busbar may be arranged on the top faces of both stacks, resulting in a large overlap of the busbars.

Further, the capacitor may comprise a third busbar and a fourth busbar. The third busbar may be arranged on the bottom face of the first stack and on the bottom face of the second stack and connected to the bottom faces of the winding elements in the first stack. The fourth busbar may be arranged on the bottom face of the first stack and on the bottom face of the second stack and connected to the bottom faces of the winding elements in the second stack, wherein the third busbar and the fourth busbar overlap each other. Accordingly, both of the third busbar and the fourth busbar may be arranged on the bottom faces of both stacks, resulting in a large overlap of the busbars.

In one embodiment, the capacitor may comprise four busbars, wherein the busbars are arranged between the first stack and the second stack and wherein the busbars are connected to the winding elements such that a current flows in adjacent busbars in opposite directions. This arrangement of the busbars may result in a particularly well cancellation of the magnetic fields. The four busbars may be arranged such that each busbar connected to a pole of a first polarity is adjacent only to busbars connected to poles of the second polarity and, vice versa, each busbar connected to a pole of a second polarity is adjacent only to busbars connected to poles of the first polarity.

In particular, the first busbar may be connected to the top faces of the winding elements in the first stack having a first polarity. The second busbar may be connected to the top faces of the winding elements in the second stack having a second polarity opposite to the first polarity. The third busbar may be connected to the bottom faces of the winding elements in the second stack having the first polarity. The fourth busbar may be connected to the bottom faces of the winding elements in the first stack having the second polarity. The first busbar may be directly adjacent to the second busbar. The second busbar may be directly adjacent to the third busbar. The third busbar may be directly adjacent to the fourth busbar.

The first busbar may comprise two parts and/or the second busbar may comprise two parts. Each of the parts may have a Z-shaped cross-section. This design of the busbars may provide a particularly large overlapping area and, thus, a very effective cancellation of the electromagnetic flux. Thereby, low parasitic inductances and low parasitic resistances may be provided and negative electromagnetic interactions may be avoided.

The first busbar may be connected to the winding elements directly, e.g., by welding or soldering, and the second busbar may be connected to the winding elements directly, e.g., by welding or soldering. The direct connection reduces parasitic inductances and parasitic resistances and avoids negative electromagnetic interactions compared to a connection by connecting elements. However, in alternate embodiments, the busbars may be connected to the winding elements by connecting elements.

The first busbar may be formed such that it contacts two connection elements on a top face of each winding element, wherein the second busbar is formed such that it contacts two connection elements on a bottom face of each winding element, wherein the first and the second busbar each cover three lateral faces of the stack and the first busbar partly covers the top face of the stack and the second busbar partly covers the bottom face of the stack.

The capacitor may comprise at least four winding elements, wherein at least two winding elements are arranged in a first stack and at least two winding elements are arranged in a second stack, wherein the winding elements are arranged in the first stack and, respectively, in the second stack such that a top face of the first stack has a polarity opposite to the polarity of a top face of the second stack, wherein each of the first and the second busbar has a z-shaped cross-section, wherein the first busbar and the second busbar are arranged between the first stack and the second stack, wherein each of the first busbar and the second busbar partly covers the top face of the first stack and partly covers the bottom face of the second stack.

The winding elements have a non-circular diameter. In particular, the winding element may be flat. Flat winding elements may be arranged in a stack such that no space is wasted between the winding elements.

The capacitor may be a DC link capacitor. The capacitor can be any kind of capacitor. For example, the capacitor may be a film capacitor or an electrolyte capacitor. The capacitor may be a power capacitor.

An electrolytic capacitor is polarized—with a positive and negative terminal- and is filled either with a chemical or solid polymer electrolyte, which gives the characteristic of achieving extremely large capacitance values. The film capacitor may comprise metallized films.

BRIEF DESCRIPTION OF THE DRAWINGS

In the following, the present invention is described with respect to the drawings:

FIGS. 1 to 42 show capacitors according to a first to thirteenth embodiments.

DETAILED DESCRIPTION OF ILLUSTRATIVE EMBODIMENTS

Figure 1:
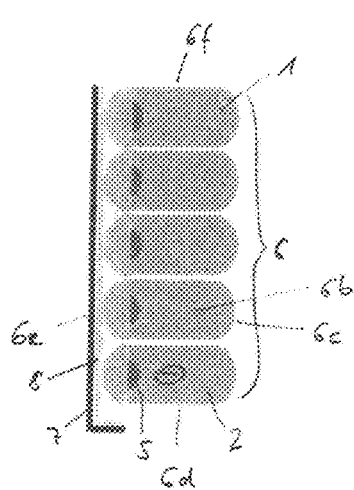
Figure 2:
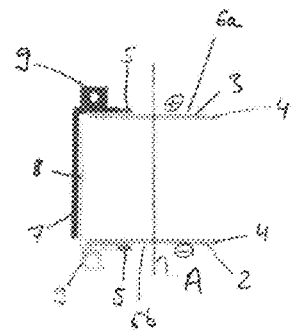

FIGS. 1 and 2 show a capacitor according to a first embodiment. FIG. 1 shows the capacitor in a bottom view and FIG. 2 shows the capacitor in a side view.

The capacitor is a DC link capacitor which is designed for voltages above 600 V and switching frequencies of more than 10 kHz.

The capacitor comprises a plurality of winding elements 1. In the embodiment shown in FIGS. 1 and 2, the capacitor comprises five winding elements 1. However, the capacitor may also comprise any other number of winding elements 1.

Each winding element 1 is wound around an axis A. The axis A extends from a bottom face 2 of the winding element 1 to a top face 3 of the winding element 1. The top face 3 of each winding element 1 is covered with a metallization 4, the so-called Schoop-layer. The metallization 4 of the top face 3 is connected to a first electrode or a first set of electrodes of the winding element. The bottom face 2 of each winding element 1 is also covered with a metallization 4, i.e., a Schoop-layer. The metallization 4 of the bottom face 3 is connected to a second electrode or a second set of electrodes of the winding element 1. The first electrode and the metallization 4 on the top face 3 or the first set of electrodes and the metallization 4 on the top face 3 form a first pole of the winding element 1. The second electrode and the metallization 4 on the bottom face 2 or the second set of electrodes and the metallization 4 on the bottom face 2 form a second pole of the winding element 1. During the operation of the capacitor 1, a voltage is applied between the first pole and the second pole.

For the sake of visualization, the first pole is marked with a "plus" in the drawings and the second pole is marked with a "minus". As alternating currents are applied, the polarizations can be altered continuously.

On the top face 3 and on the bottom face 2 of each winding element 1 a connection element 5, e.g., a connection stripe or a bonding wire, is arranged.

The winding elements 1 have a non-circular cross section. In particular, the winding elements 1 are flat.

The winding elements 1 are arranged in a stack 6. The winding elements 1 are arranged in the stack 6 such that the top face 3 of each winding element 1 faces in the same direction. The winding elements 1 are arranged in the stack 6 such that their axes A are parallel. A top face 6a of the stack 6 is formed by the top faces 3 of the winding elements 1. Further, a bottom face 6b of the stack 6 is formed by the bottom faces 2 of the winding elements 1. The bottom face 6b of the stack 6 is opposite to the top face 6a of the stack 6. Moreover, the stack 6 has four lateral faces 6c, 6d, 6e, 6f. Each of the lateral faces 6c, 6d, 6e, 6f is perpendicular to the top face 6a and to the bottom face 6b.

The capacitor comprises a first busbar 7 and a second busbar 8, which enable contacting the stack 6 of winding elements 1. In particular, the first busbar 7 is configured to apply a voltage to the first electrode or the first set of electrodes of each winding element 1. The second busbar 8 is configured to apply a voltage to the second electrode or the second set of electrodes of each winding elements 1.

The first busbar 7 is connected to the top face 3 of each winding element 1. In particular, the first busbar 7 is connected to the connection element 5 on the top face 3 of each winding element 1. The second busbar 8 is connected to the bottom face 2 of each winding element 1. In particular, the second busbar 8 is connected to the connection element 5 on the bottom face 2 of each winding element 1.

The first busbar 7 comprises at least one terminal 9. The first busbar 7 is configured to be connected to a pole of an external power supply, for example an insulated-gate bipolar transistor (IGBT), via the at least one terminal 9. The second busbar 8 also comprises at least one terminal 9. The second busbar 8 is configured to be connected to another pole of the external power supply, for example the insulated-gate bipolar transistor (IGBT), via the at least one terminal 9. Each of the first busbar 7 and the second busbar 8 can comprise more than one terminal 9.

In the first embodiment, the terminal 9 of the first busbar 7 is arranged at the top face 6a of the stack 6 and the terminal 9 of the second busbar 8 is arranged at the bottom face 6b of the stack 6. The first busbar 7 and the second busbar 8 are arranged at a lateral face 6e of the stack 6. Additionally, the first busbar 7 partly overlaps the top face 6a of the stack. The second busbar 8 partly overlaps the bottom face 6b of the stack 6.

The first busbar 7 and the second busbar 8 are arranged such that they overlap each other. A thin isolator plate is arranged between the first busbar 7 and the second busbar 8 in the area of the overlap of the busbars 7, 8. The thin isolator plate prevents a short circuit between the busbars. The thin isolator plate is not shown in FIGS. 1 and 2.

The first busbar 7 is configured to apply a voltage to the first electrode or the first set of electrodes of each winding element 1. The second busbar 8 is configured to apply a voltage to the second electrode or the second set of electrodes of each winding elements 1. As the first electrode and the second electrode or, respectively, the first set of electrodes and the second set of electrodes have an opposite polarity, a current flowing through the first busbar 7 and a current flowing through the second busbar 8 have an opposite direction.

The current flowing through the first busbar 7 generates a first magnetic field. The current flowing through the second busbar 8 generates a second magnetic field. As the first busbar 7 and the second busbar 8 overlap each other and as the currents in the first busbar 7 and the second busbar 8 have opposite directions, the magnetic fields generated in the first busbar 7 and in the second busbar 8 cancel each other or at least weaken each other.

Thus, the arrangement of the busbars 7, 8 overlapping each other results in reduced magnetic fields of the busbars 7, 8. Thereby, the inductance of the busbars 7, 8 is reduced. As the inductance from the busbar 7, 8 to each of the winding element 1 is very low and homogeneous and as each winding element 1 has the same capacitance, each winding element 1 has almost the same impedance. If the winding elements 1 had different impedances, resonance effects in the capacitor, in particular when applying high switching frequencies above 10 kHz, would be unavoidable. Due to the overlapping busbars 7, 8, the impedance for each winding element 1 is almost the same such that no significant resonance effects occur. Accordingly, the losses in the capacitor can be reduced. In particular, parasitic inductances and resistances are strongly reduced. The impedance from the terminal 9 to each winding element 1 is homogeneous in all the frequency bandwidths. This results in a low equivalent series resistance (ESR), a frequency stable ESR, a homogeneous ESR between each terminal and each connection element, a low equivalent series inductance (ESL), a homogeneous ESL between each terminal and each connection element and the avoidance of an internal resonance. This enables the operation of the capacitor at voltages above 600 V and at switching frequencies of more than 10 kHz.

The use of the busbars 7, 8, which are connected to the connection elements 5 of each winding element 1 as shown in FIGS. 1 and 2 results in a homogeneous internal current distribution. In particular, the length along which the current has to travel through the busbars 7, 8 from the terminal 9 of the busbar 7, 8 to the connection element 5 is roughly the same. Due to the design of the capacitor it is not possible to design the busbar 7, 8 such that the length along which the current has to travel is identical for each winding element 1. However, as the inductance of the busbars 7, 8 is very low due to the cancellation of the magnetic fields, the differences in the length along which the current has to travel do not significantly impair the performance of the winding elements 1.

Figure 3:
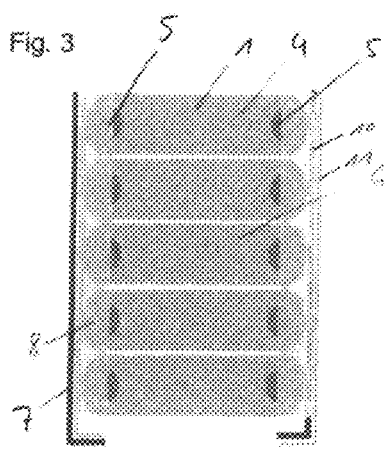
Figure 4:
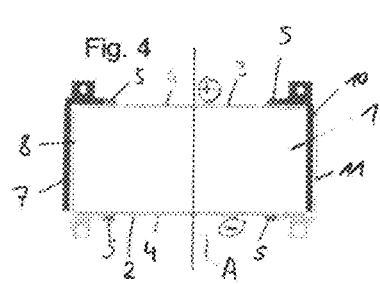

FIGS. 3 and 4 show a capacitor according to a second embodiment. FIG. 3 shows a bottom view of the capacitor and FIG. 4 shows a side view.

The capacitor according to the second embodiment comprises a fifth busbar 10 and a sixth busbar 11. The fifth 10 and the sixth busbars 11 are arranged at an opposite lateral side of the stack 6 with respect to the first busbar 7 and the second busbar 8.

In the capacitor of the second embodiment, each winding element 1 comprises two connection elements 5 arranged at its top face 3 and two connection elements 5 arranged at its bottom face 2. The connection elements 5 arranged at the top face 3 are both connected to the metallization 4 covering the top face 3 and, thereby, to the first electrode or, respectively, to the first set of electrodes. The connection elements 5 arranged at the bottom face 2 are both connected to the metallization 4 covering the bottom face 2 and, thereby, to the second electrode or, respectively, to the second set of electrodes.

The fifth busbar 10 is connected to the top face 3 of each winding element 1. In particular, the first busbar 7 is connected to one of the connection elements 5 on the top face 3 of each winding element 1 and the fifth busbar 10 is connected to the respective other connection element 5 on the top face 3 of each winding element 1.

The sixth busbar n is connected to the bottom face 2 of each winding element 1. In particular, the second busbar 8 is connected to one of the connection elements 5 on the bottom face 2 of each winding element 1 and the sixth busbar 1 is connected to the respective other connection element 5 on the bottom face 2 of each winding element 1.

Accordingly, according to the second embodiment, a current can be coupled into each winding element 1 to the first electrode or the first set of electrodes by the first busbar 7 and by the fifth busbar 10 and to the second electrode or the second set of electrodes by the second busbar 8 and by the sixth busbar n. As the current is coupled into each pole of winding element 1 by two busbars at two points, the capacitor according to the second embodiment is configured to be operated by stronger currents than the capacitor according to the first embodiment.

The fifth and the sixth busbars 10, ii overlap each other. Thus, their magnetic fields cancel or at least weaken each other. Therefore, the fifth and the sixth busbars 10, ii also have a low inductance.

Moreover, the capacitor of the second embodiment is symmetric as the current can be induced into each pole of each winding element 1 from two positions which are symmetric to each other. This symmetric design of the capacitor can further reduce resonance effects, thereby reducing losses due to parasitic impedances and resistances.

Figure 5:
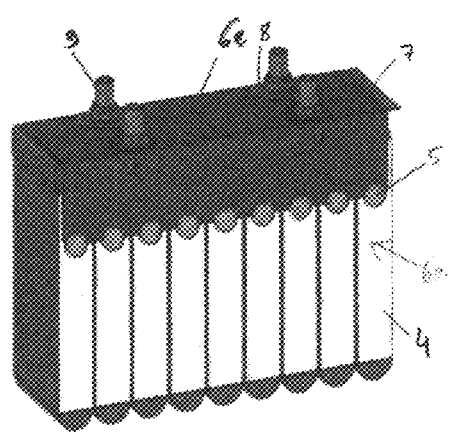
Figure 6:
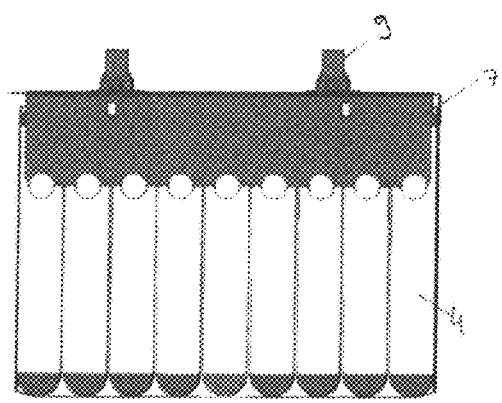
Figure 7:
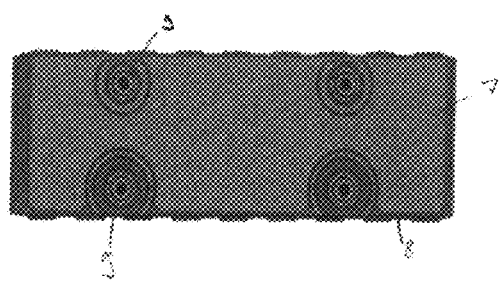
Figure 10:
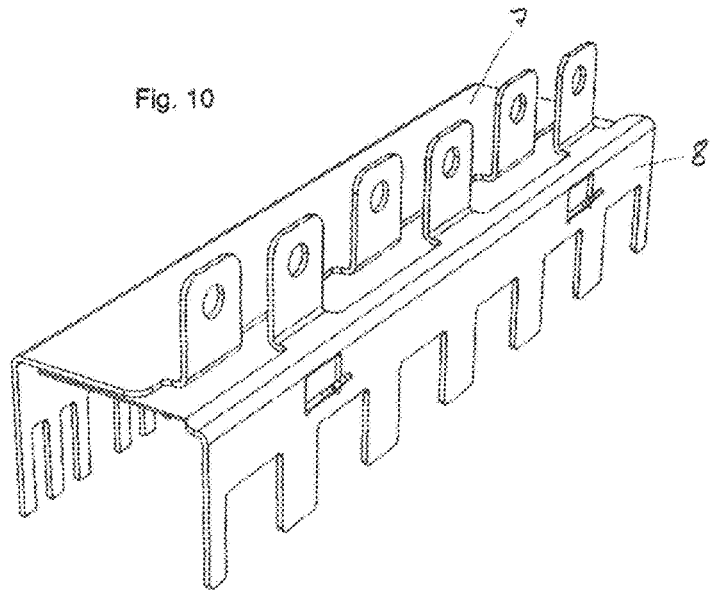

FIGS. 5 to 10 show a capacitor according to a third embodiment. FIG. 5 shows the capacitor in a perspective view. FIG. 6 shows the capacitor in a side view. FIG. 7 shows the capacitor in a top view. FIG. 8 shows the capacitor in another side view which is rotated by 90 degrees relative to FIG. 6. FIG. 9 shows the busbars 7, 8 and the winding elements 1 of the capacitor in a perspective view. FIG. 10 shows only the busbars 7, 8 in a perspective view.

The capacitor according to the third embodiment also comprises a first busbar 7 connected to the first electrode or the first set of electrodes of each winding element 1 and a second busbar 8 connected to the second electrode or the second set of electrodes of each winding element 1. The first busbar 7 and the second busbar 8 are both arranged on a first lateral face 6e of the stack 6. The first busbar 7 and the second busbar 8 overlap completely on the first lateral face 6e. Further, the first busbar 7 partly overlaps the top face 6a of the stack 6 and the second busbar 8 partly overlaps the bottom face 6b of the stack 6. The first busbar 7 is electrically connected to the metallization 4 on the top face 3 of each winding element 1. The second busbar 8 is electrically connected to the metallization 4 on the bottom face 2 of each winding element 1. As shown in FIG. 9, an isolator plate 12 is arranged between the first busbar 7 and the second busbar 8 in order to avoid a short circuit between the busbars. The isolator plate 12 is thin such that it does not influence the magnetic field significantly.

As already discussed with respect to the previous embodiments, due to the overlap of the busbars 7, 8, a magnetic field generated by a current flowing through the first busbar 7 is weakened or cancelled by a magnetic field generated by a current flowing through the second busbar 8, wherein the current through the second busbar 7 flows in a direction opposite to the current flowing through the first busbar 7. This results in a very low inductance.

Figure 11:
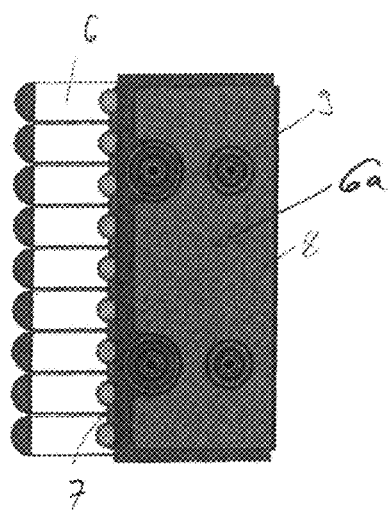
Figure 12:
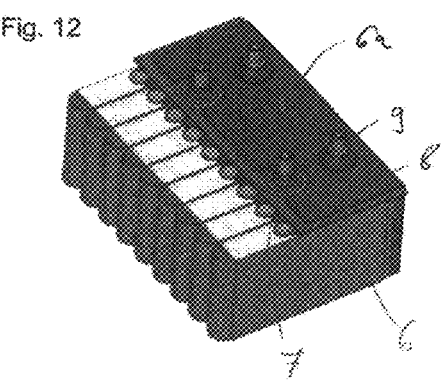
Figure 13:
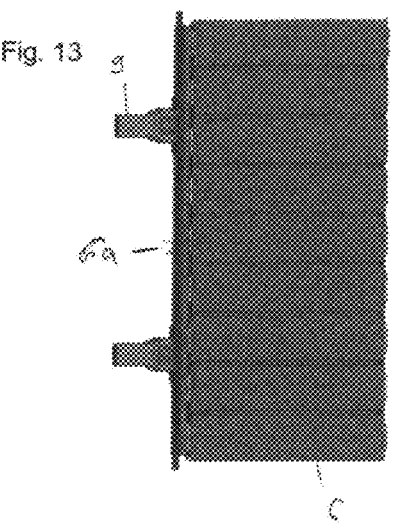
Figure 14:
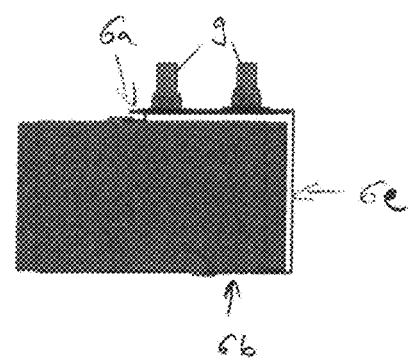
Figure 15:
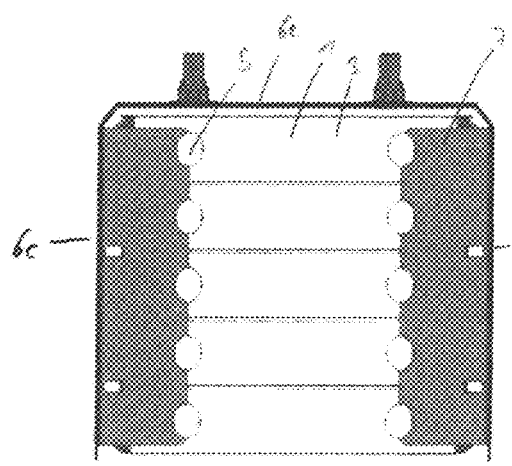
Figure 16:
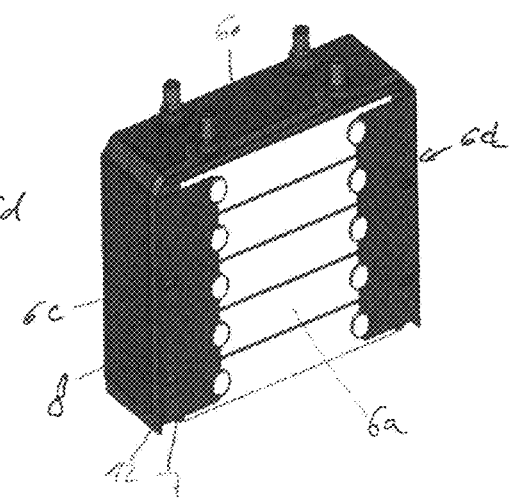
Figure 17:
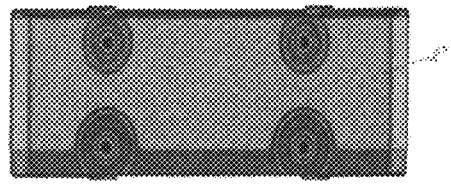
Figure 18:
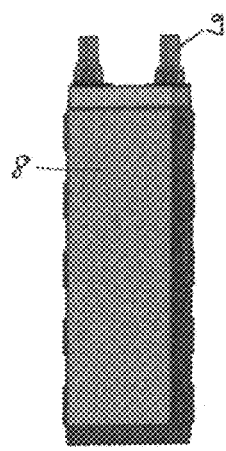

FIGS. 11 to 14 show a capacitor according to a fourth embodiment. FIG. 11 shows a top view of the capacitor. FIG. 12 shows a perspective view of the capacitor. FIG. 13 shows a side view and FIG. 14 shows another side view from a different angle. The capacitor according to the fourth embodiment differs from the third embodiment in the arrangement of the terminals 9 of the busbars 7, 8. According to the third embodiment, the terminals 9 are arranged on the first lateral face 6e of the stack 6. According to the fourth embodiment, the terminals 9 are arranged on the top face 6a of the stack 6.

Further, the first busbar 7 and the second busbar 8 are designed differently in the fourth embodiment. In particular, each of the first and second busbar 7, 8 is arranged such that it completely covers the first lateral face 6e of the stack 6 and that it partly covers the top face 6a and the bottom face 6b of the stack 6.

Moreover, the capacitor of the fourth embodiment differs from the previous embodiments in the number of winding elements 1. The capacitor of the fourth embodiment comprises nine winding elements 1. The capacitor can also be constructed with any other number of winding elements 1.

In the fourth embodiment, the first and the second busbar 7, 8 also overlap each other, resulting in a cancellation of weakening in the magnetic fields generated by currents flowing through the busbars 7, 8.

FIG. 15 to 18 show a capacitor according to a fifth embodiment. The fifth embodiment differs in the design of the first busbar 7 and the second busbar 8 from the previous embodiments.

The busbars 7, 8 are connected to each winding element 1 at two points similar to the second embodiment. However, instead of providing two separate busbars 7, 8 which are connected to the same pole of each winding element 1 as shown in the second embodiment, the first busbar 7 is formed such that it contacts both of the connection elements 5 on the top face 3 of each winding element 1. The second busbar 8 is formed such that it contacts both of the connection elements 5 on the bottom face 2 of each winding element 1. The first and the second busbar 7, 8 completely cover three lateral faces 6c, 6d, 6e of the stack 6 and partly cover the top face 6a and the bottom face 6b of the stack 6.

The first and the second busbar 7, 8 overlap each other. In particular, the first busbar 7 and the second busbar 8 are arranged at almost identical positions. The second busbar 8 overlaps more than 90% of the area of the first busbar 7. The overlap of the busbars 7, 8 results in a very low inductance, as discussed above.

As discussed with respect to the second embodiment, the capacitor of the fifth embodiment is suitable for strong currents as the current is coupled via two connection elements 5 to each pole of each winding element 1.

Figure 19:
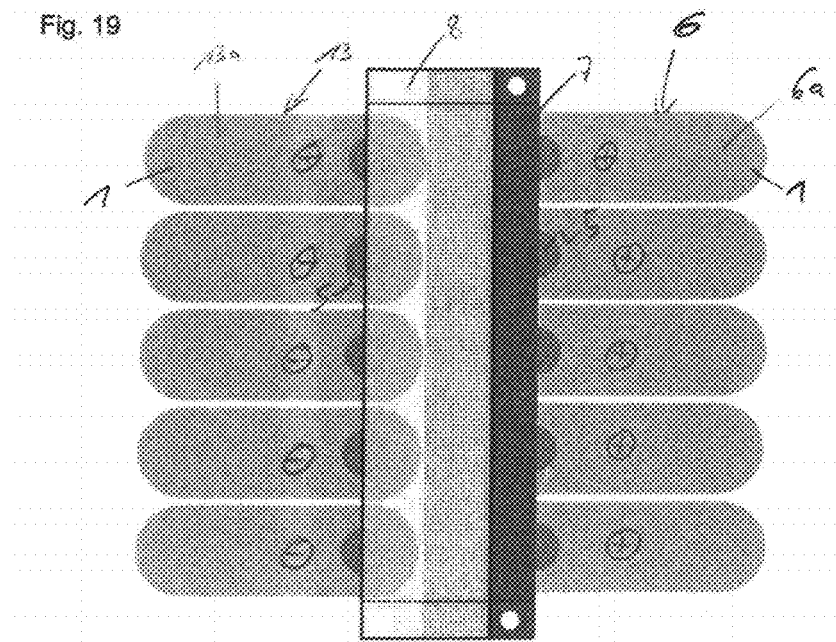
Figure 20:
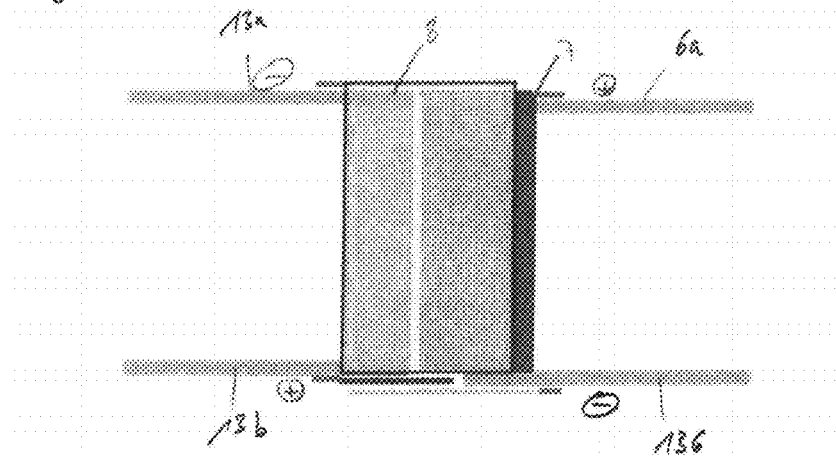

FIGS. 19 and 20 show a capacitor according to a sixth embodiment. FIG. 19 shows a top view of the capacitor and FIG. 20 shows a side view of the capacitor.

The capacitor comprises two stacks 6, 13, each stack 6, 13 consisting of a plurality of winding elements 1. The winding elements 1 in the first stack 6 are arranged such that they are inverted in their polarity compared to the adjacent winding elements 1 in the second stack 13. In particular, the top face 3 of the winding elements 1 of the first stack 6 corresponds to the first pole and the top face 3 of the winding elements 1 of the second stack 13 corresponds to the second pole.

The capacitor according to the sixth embodiment comprises a first busbar 7 and a second busbar 8. Each of the first and the second busbar 7, 8 has a z-shaped cross-section. Each of the first busbar 7 and the second busbar 8 is arranged between the two stacks 6, 13. Moreover, the first busbar 7 partly covers the top face 6a of the first stack 6 and partly covers the bottom face 13b of the second stack 13. The first busbar 7 is connected to the connection element 5 of each winding element 1 on the top face 6a of the first stack 6 and to each connection element 5 on the bottom face 13b of each winding element 1 in the second stack 13. Vice versa, the second busbar 8 is connected to each connection element 5 on the bottom face 2 of each winding element 1 of the first stack 6 and to the connection element 5 on the top face 3 of each winding element 1 of the second stack 13. The current flowing through the first busbar 7 is applied to the first pole of the first stack 6 and the first pole of the second stack 13 and the current flowing through the second busbar 8 is applied to the second pole of the first stack 6 and the second pole of the second stack 13. In the first stack 6, the first pole is arranged at the top face 6a of the stack 6 and in the second stack 13 the second pole is arranged at the top face of the second stack 13a. Accordingly, the currents flowing through the busbars 7, 8 flow in opposite directions, resulting in magnetic fields that cancel or weaken each other. Thereby, a capacitor having a very low inductance and homogeneous impedance between the winding elements is provided.

FIGS. 21 to 23 show a capacitor according to a seventh embodiment. FIG. 21 shows the capacitor in a perspective view. FIG. 22 shows the capacitor in a top view and FIG. 23 shows the capacitor in a side view.

The capacitor also comprises two stacks of winding elements 1 as already discussed with respect to the sixth embodiment. The design of the busbars is different in the seventh embodiment.

In the seventh embodiment, the first busbar 7 is arranged at the top faces 6a, 13a of both of the first stack 6 and the second stack 13. The first busbar 7 is connected only to the connection elements 5 on the top faces 3 of the winding elements 1 in the first stack 6. The first busbar 7 is not electrically connected to the top face 13a of the second stack 13. The second busbar 8 is connected only to the connection elements 5 on the top faces 3 of the winding elements 1 in the second stack 13. The second busbar 8 is not electrically connected to the top face 6a of the first stack 6. Moreover, both busbars 7, 8 overlap each other.

Additionally, the capacitor comprises a third busbar 14 which is connected to the connection elements 5 on the bottom face 13b of the second stack 13 and a fourth busbar 15 which is connected to the connection elements 5 on the bottom face 6b of the first stack 6. The third busbar 14 and the fourth busbar 15 are both arranged on the bottom faces 6b, 13b of both stacks 6, 13 and overlap each other.

The first busbar 7 and the third busbar 14 are configured to apply a current to the electrodes of the first pole. The second busbar 8 and the fourth busbar 15 are configured to apply a current to the electrodes of the second pole. The magnetic fields of the third busbar 14 and the fourth busbar 15 cancel or weaken each other as the busbars 14, 15 overlap each other and as the currents flow in opposite directions in the busbars 14, 15.

Figure 24:
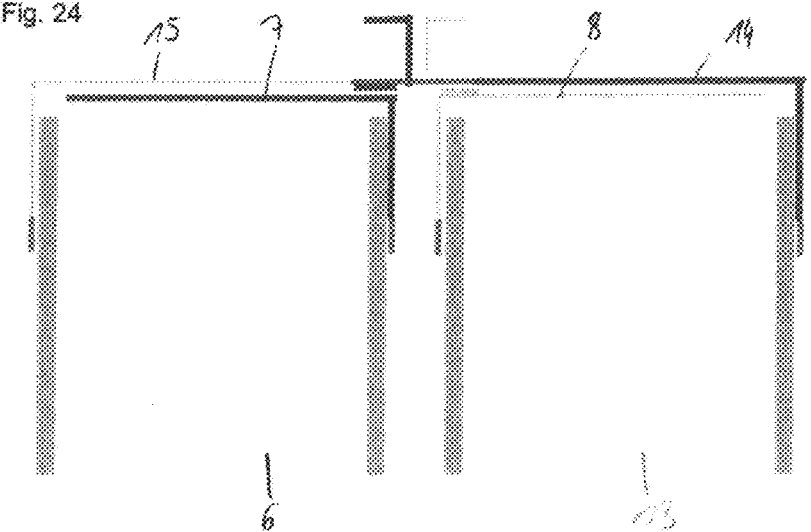
Figure 25:
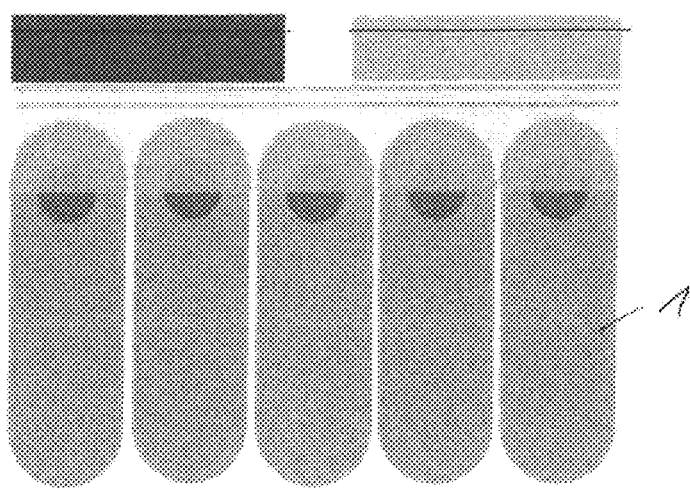

FIGS. 24 and 25 show a capacitor according to an eighth embodiment. The busbars 7, 8, 14, 15 of the eighth embodiments also overlap each other. The capacitor of the eight embodiment also comprises two stacks 6, 13 of winding elements 1. In contrast to the sixth and seventh embodiment, the winding elements 1 are rotated in the stacks by 90°.

FIGS. 26 to 28 show a capacitor according to a ninth embodiment. FIG. 26 shows a top view of the capacitor, FIG. 27 shows a side view of the capacitor and FIG. 28 shows a perspective view of the capacitor.

The capacitor comprises four busbars 7, 8, 14, 15. Moreover, the capacitor comprises two stacks 6, 13 of winding elements 1. The first busbar 7 and the second busbar 8 are arranged at a lateral side 6e of the first stack 6 of winding elements 1. Moreover, the first busbar 7 and the second busbar 8 partly cover the top face 6a and the bottom face 6b of the first stack 6. The first busbar 7 is connected to the connection elements 5 on the top face 3 of the winding elements 1 of the first stack 6. The second busbar 8 is connected to the connection elements 5 on the bottom face 6b of the first stack 6.

Further, a third busbar 14 and a fourth busbar 15 are arranged on a lateral face 13e of the second stack 13. In particular, the third busbar 14 and the fourth busbar 15 are arranged on the lateral face 13e which is directly adjacent to the lateral face 6e of the first stack 6 on which the first and the second busbar 7, 8 are arranged. The third busbar 14 is connected to the connection elements 5 on the bottom face 13b of the second stack 13. The fourth busbar 15 is connected to the connection elements 5 on the top face 13a of the second stack 13.

FIG. 29 shows a schematic view explaining the connections of the busbars 7, 8, 14, 15 and the winding elements 1. For the sake of simplicity, the first pole is marked again with a "plus" and the second pole is again marked with a "minus" in FIG. 29. It can be seen in FIG. 29 that busbars having opposite polarities are arranged adjacent to each other. In particular, each busbar has an opposite polarity with respect to its adjacent busbars. Thus, as the four busbars 7, 8, 14, 15 overlap in the gap between the two stacks 6, 13, it is ensured that their magnetic fields cancel each other very efficiently. This design results in an even lower inductance and an even more homogeneous impedance between the winding elements.

Figure 30:
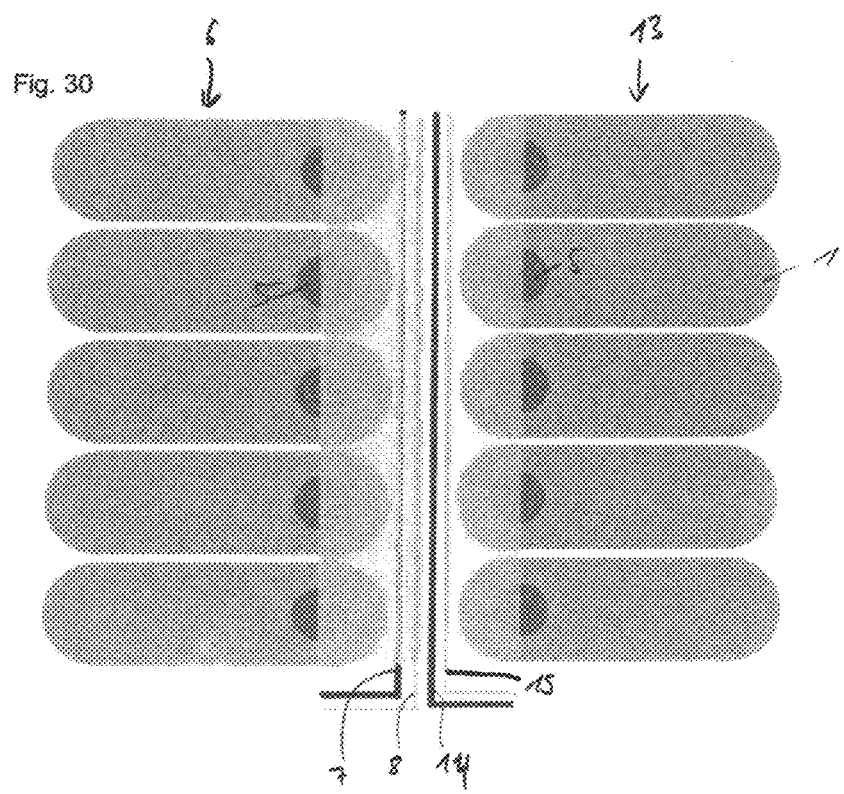
Figure 31:
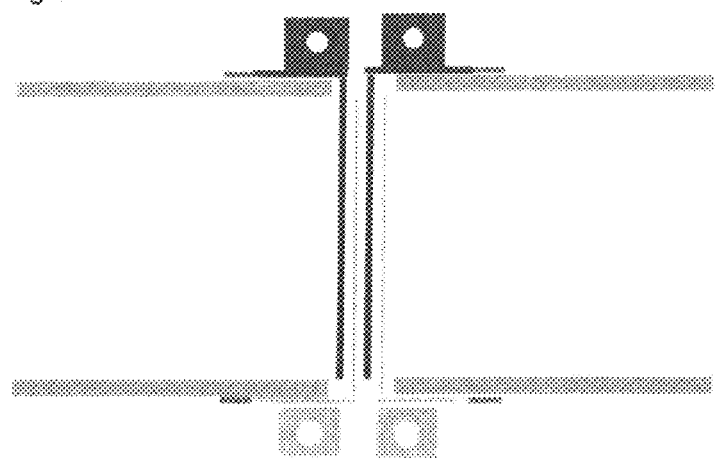

FIGS. 30 and 31 show a capacitor according to a tenth embodiment. The capacitor of the tenth embodiment also comprises two parallel stacks 6, 13 of winding elements 1 and four busbars 7, 8, 14, 15 arranged between the winding elements 1. The capacitor according to the tenth embodiment differs from the capacitor according to the ninth embodiment only in the arrangement of the terminals 9 of the busbar.

Figure 32:
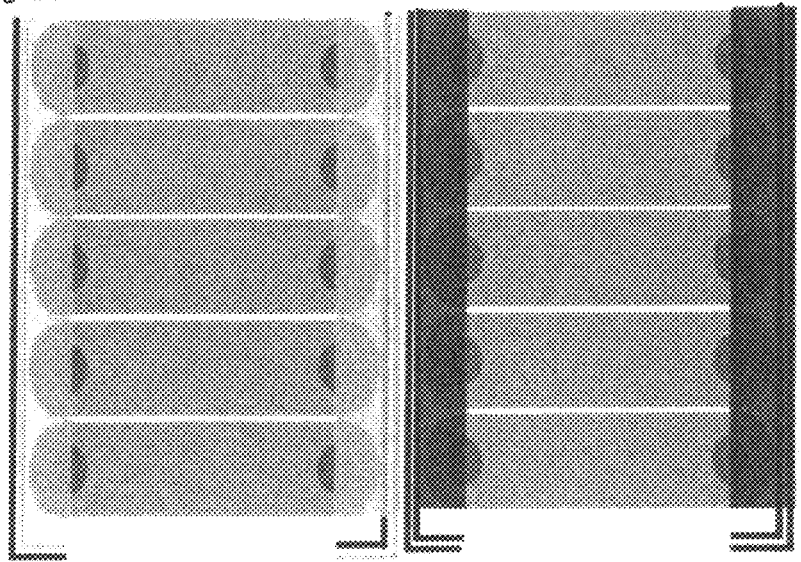
Figure 33:
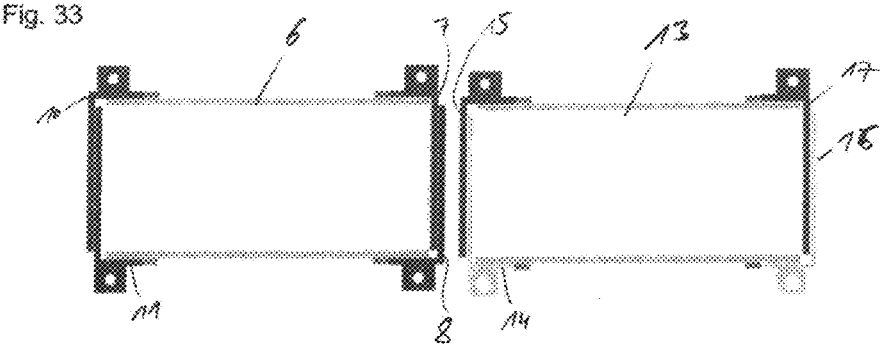
Figure 34:
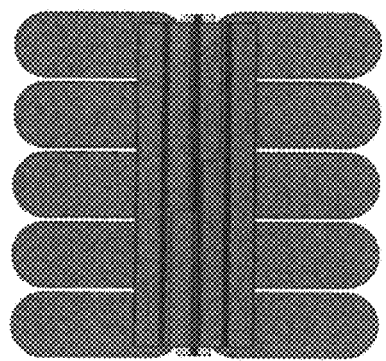
Figure 35:
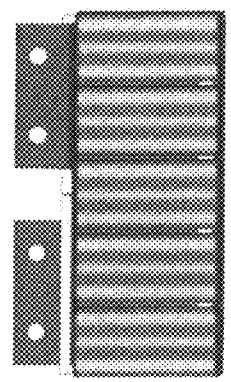
Figure 36:
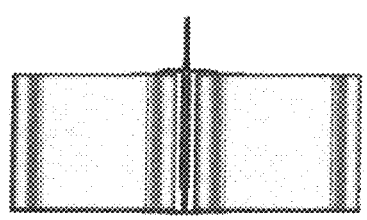
Figure 37:
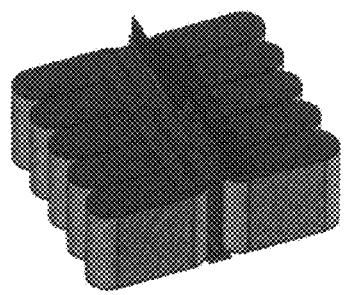

FIGS. 32 and 33 show a capacitor according to an eleventh embodiment. The capacitor according to the eleventh embodiment is based on the capacitor according to the tenth embodiment and additionally comprises a fifth and sixth busbar 10, 11 arranged at a lateral face 6f of the first stack 6 and a seventh and eighth busbar 16, 17 arranged at a lateral face 13f of the second stack 13. The capacitor according to the eleventh embodiment is designed to apply a current to each pole of each stack 6, 13 at two positions, thereby enabling the application of stronger currents similar to the second embodiment. This capacitor further provides a high degree of symmetry, resulting in even fewer resonance effects. Thereby, losses due to parasitic inductances and resistances are further reduced.

Figure 38:
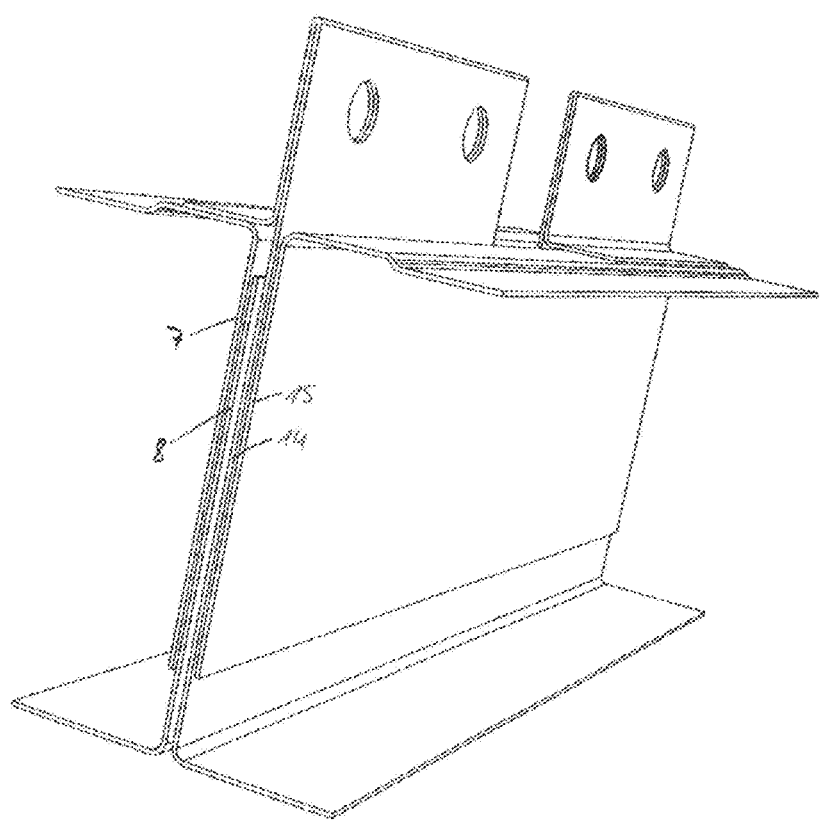
Figure 39:
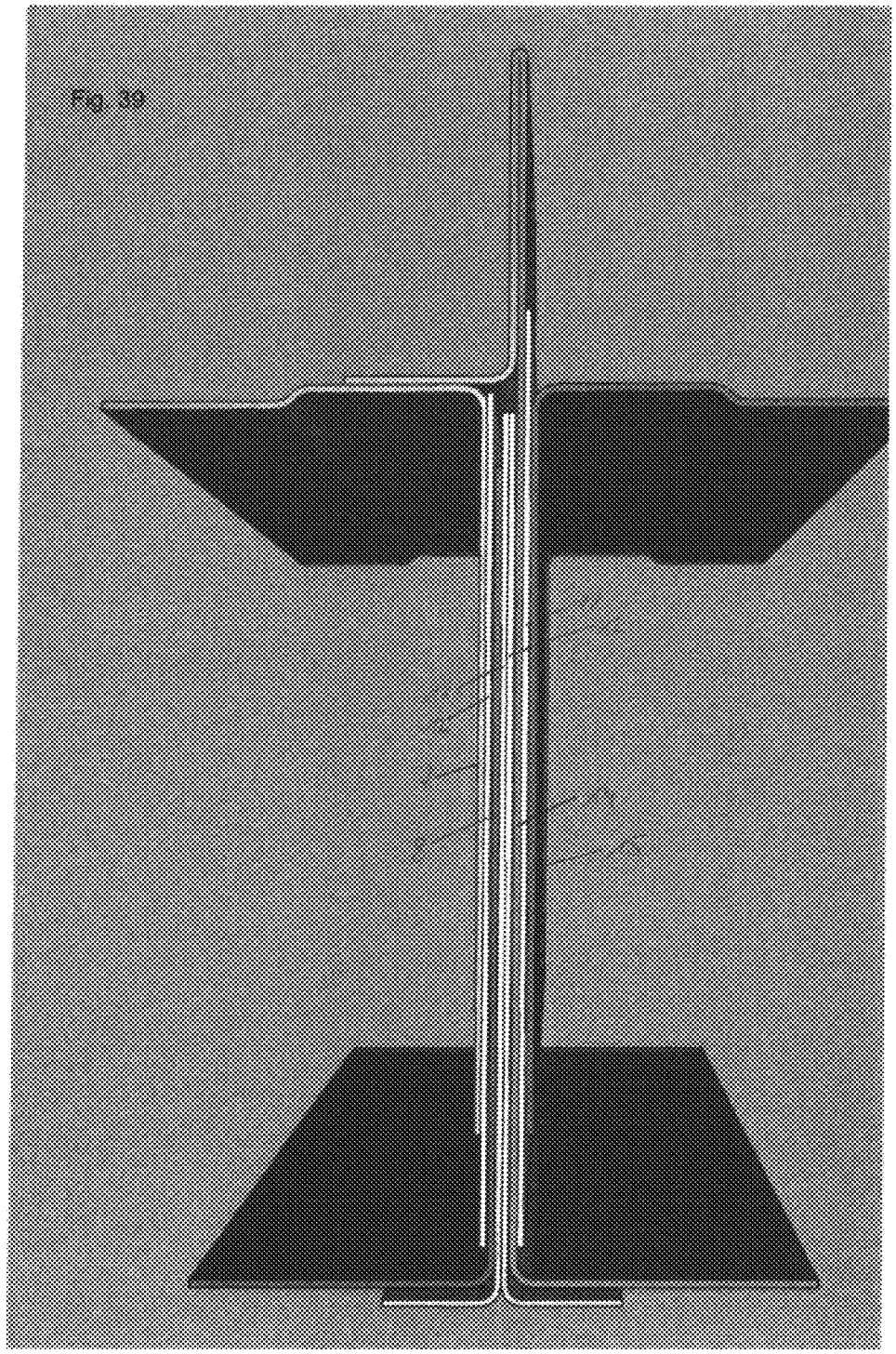

FIGS. 34 to 37 show a capacitor according to a twelfth embodiment. FIG. 38 shows the busbars 7, 8, 14, 15 of the capacitor of the twelfth embodiment. FIG. 39 also shows a perspective view of the busbars 7, 8, 14, 15 of the twelfth embodiment from a different perspective. The busbars 7, 8, 14, 15 are bent and folded such that a stack is formed wherein alternatively busbars of the first polarity and busbars of the second polarity are arranged overlapping each other and can be seen best in FIG. 39. Thin isolation plates 12 are arranged between the busbars 7, 8, 14, 15 in order to prevent a short circuit. As discussed with respect to the previous embodiments, this design of the busbars 7, 8, 14, 15 also ensures that the magnetic fields cancel each other resulting in a low inductance. For the sake of simplicity, the isolator plates are not shown in FIG. 38.

In the gap between the first stack 6 and the second stack 13, four layers of overlapping busbars are arranged. The magnetic fields of the four layers of busbars cancel each other. Thus, parasitic inductances are avoided, parasitic resonances are avoided and negative electromagnetic interactions are also avoided.

The first busbar 7 and the second busbar 8 are connected to the winding elements 1 directly, e.g., by soldering or welding. No extra or separate connection elements are required for connecting the busbars 7, 8 to the winding elements 1. Such extra or separate connection elements would result in increased parasitic inductances, increased parasitic resonances and the generation of negative electromagnetic interactions. As the capacitor is free from extra or separate connection elements between the first and second busbar 7, 8 and the winding elements 1, parasitic inductances are avoided, parasitic resonances are avoided and negative electromagnetic interactions are also avoided.

The busbars 7, 8 can be designed and dimensioned such that the busbars 7, 8 are connected to a middle point of the top face 3 of the winding elements 1 and to a middle point of the bottom face 2 of the winding elements 1. This design of the busbars 7, 8 results in a high current capability and allows using winding elements 1 with a large maximum size.

Figure 40:
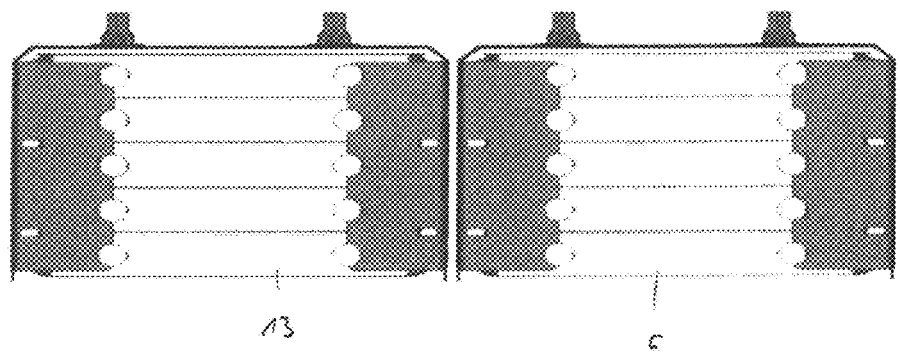
Figure 41:
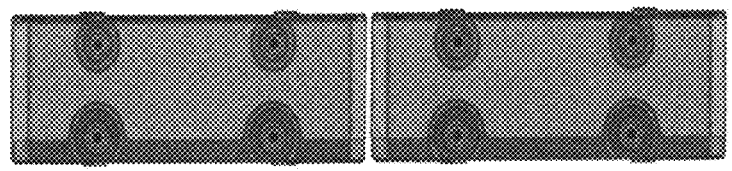
Figure 42:
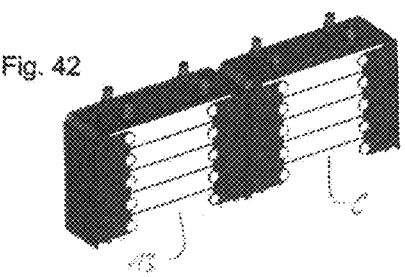

FIGS. 40 to 42 show a capacitor according to a thirteenth embodiment. The capacitor according to the thirteenth embodiment results in two capacitors according to the fifth embodiment being arranged side by side and forming two stacks 6, 13 of winding elements 1 wherein in the second stack 13 the winding elements 1 are arranged oppositely with respect to their polarity. Again, the busbars 7, 8, 14, 15 having opposite polarities overlap each other, resulting in a cancellation or weakening of the respective magnetic fields.

Figure 43:
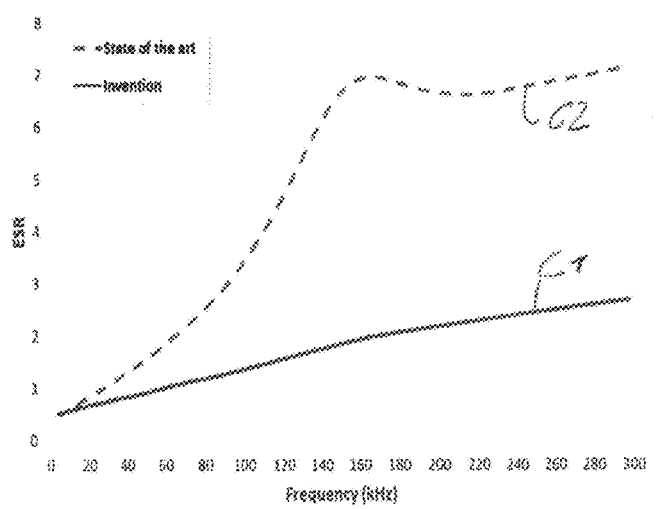
FIG. 43 shows a comparison of the ESR of a capacitor of the seventh embodiment and a reference capacitor.
Figure 44:
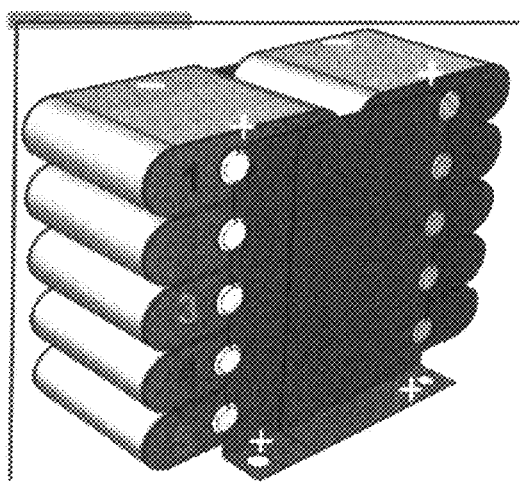
FIG. 44 shows the reference capacitor.

FIG. 43 shows a plot of the ESR over the frequency of a capacitor according to the seventh embodiment of the present invention represented by curve C1 compared to a reference capacitor as shown in FIG. 44 wherein busbars of opposite polarities do not overlap each other represented by curve C2. It can be seen in FIG. 43 that the ESR of the reference capacitor is higher than the ESR of the capacitor according to the seventh embodiment and that it is less frequency-stable due to a non-homogeneous internal current distribution and internal resonances. In particular, at frequencies higher than 10 KHz, a significant reduction in the ESR can be observed in the capacitor according to the seventh embodiment.

Figure 45:
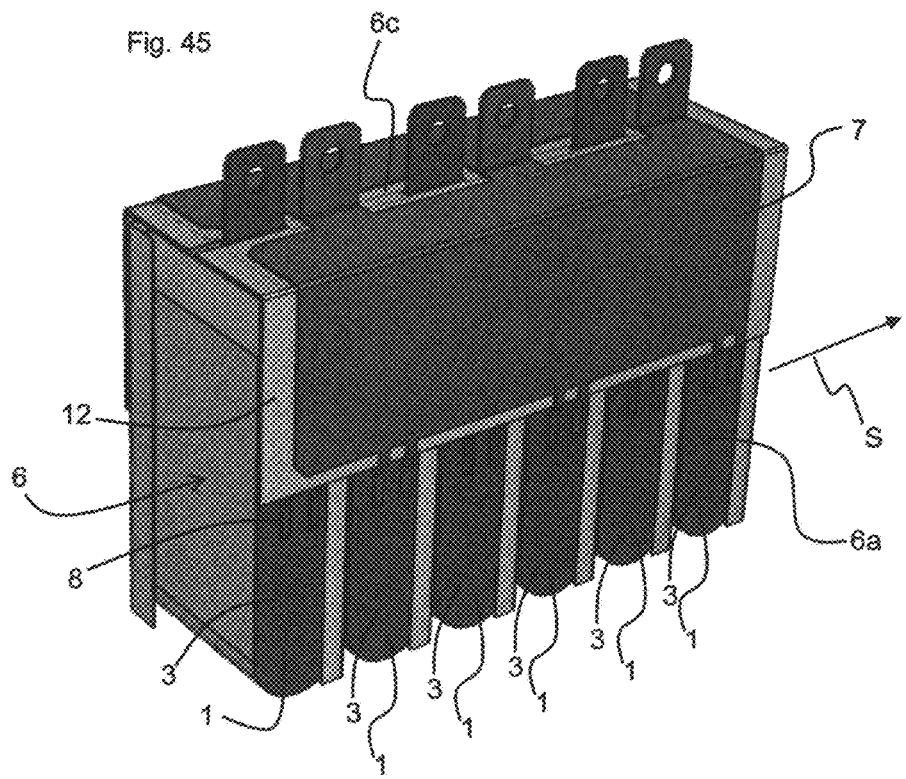
FIGS. 45 to 98 show capacitor according to a fourteenth to twenty-third embodiment.
Figure 46:
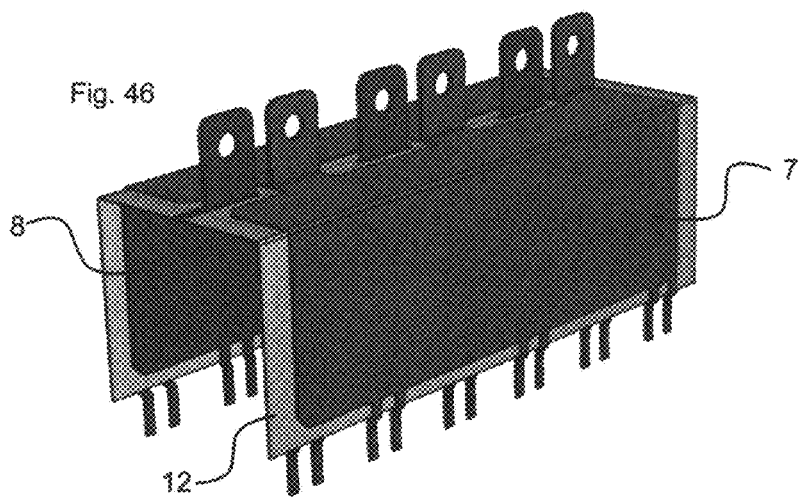
Figure 47:
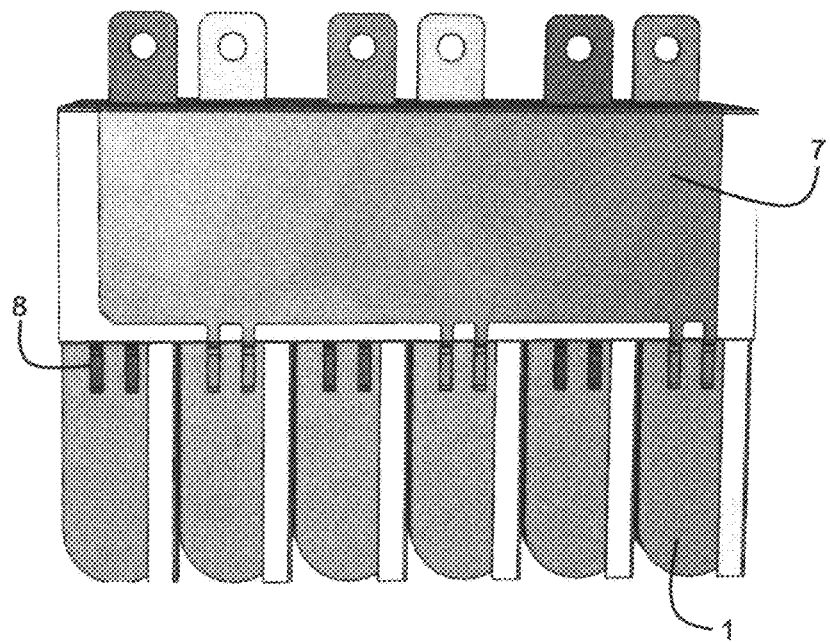
Figure 48:
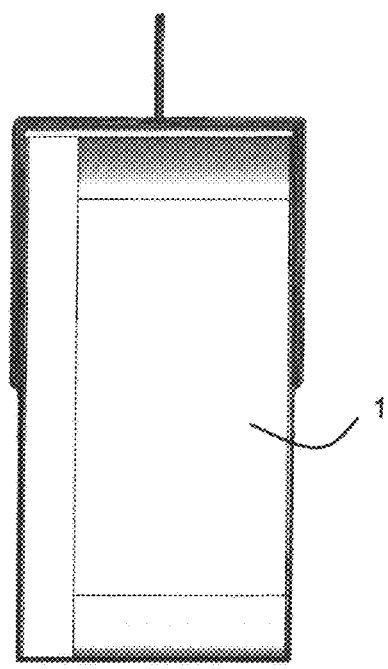

FIGS. 45 to 48 show a capacitor according to a fourteenth embodiment. FIGS. 45, 47 and 48 show perspective views of the capacitor according to a fourteenth embodiment. FIG. 46 shows the first and the second busbar 7, 8 of the capacitor. Moreover, FIG. 46 shows an isolator plate 12 being arranged between the busbars 7, 8.

Figure 49:
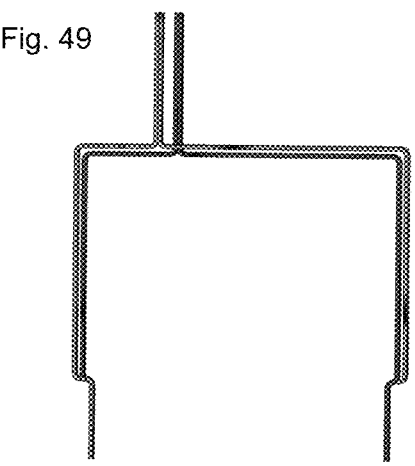
Figure 50:
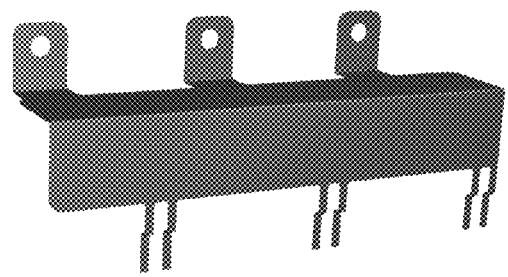
Figure 51:
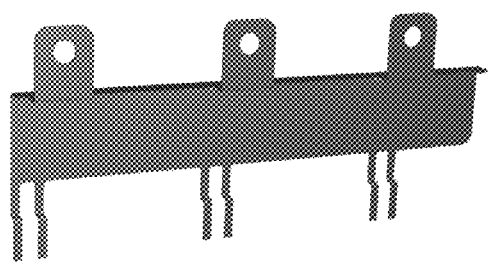
Figure 52:
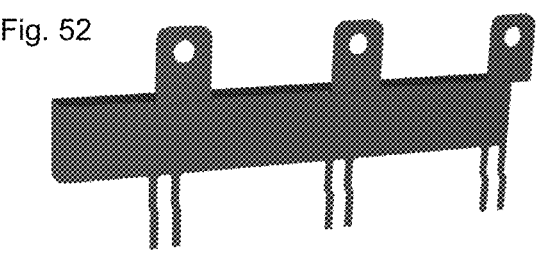
Figure 53:
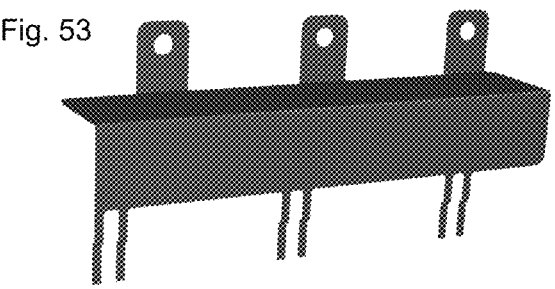

FIG. 49 shows the first busbar 7 and the second busbar 8. Each of the first busbar 7 and the second busbar 8 comprises two parts. A first part 7a of the first busbar 7 is shown in FIG. 50. A second part 7b of the first busbar 7 is shown in FIG. 51. A first part 8a of the second busbar 8 is shown in FIG. 52. A second part 8b of the second busbar 8 is shown in FIG. 53.

The winding elements 1 of the capacitor are arranged in a single stack 6. In a stacking directions S, the winding elements 1 alternate regarding their polarity.

The first busbar 7 and the second busbar 8 are both arranged on a lateral face 6c of the stack 6. The first busbar 7 and the second busbar 8 overlap each other on the lateral face 6a of the stack. Further, each of the first busbar 7 and the second busbar 8 overlaps with the top face 6a of the stack 6 and with the bottom face 6b of the stack 6.

When an alternating current is applied to the capacitor, the currents in the overlap of the first busbar 7 and the second busbar 8 have opposite directions. Thus, parasitic inductances, parasitic resistances and negative electromagnetic interactions are low.

In the stacking direction S, the first busbar 7 is alternatingly connected to the top face 3 of one winding element 1 and to the bottom face 2 of the adjacent winding element 1. The second busbar 8 is connected to the respective other face, i.e., the bottom face 3 of the one winding element 1 and the top face 2 of the adjacent winding element 1. This connection of the two busbars 7, 8 to the winding elements 1 in an alternating manner results in the winding elements 1 having alternating polarities along the stacking direction S. Thereby, the magnetic flux of adjacent winding elements 1 can compensate each other. The compensation of the magnetic flux results in a low parasitic inductance, a low parasitic resistance and low negative electromagnetic interactions.

Due to the compensation of the magnetic flux, the parasitic inductances and resistances between the winding elements 1 and between the winding elements 1 and the terminals are reduced. Thereby, the impedance from the terminals 9 to each winding element 1 is more homogeneous between winding elements 1 in all the bandwidth, so the performance of the capacitor in all the bandwidth is better. In particular, the capacitor has a low and frequency stable ESR, an homogeneous ESR from each pair of terminals, a low and homogeneous ESL from each pair of terminals, a homogeneous internal current distribution and internal resonances are avoided.

As mentioned above, each of the first busbar 7 and the second busbar 8 consists of two parts. The two parts 7a,m 7b of the first busbar 7 each have a Z-shaped cross-section.

The first part 7a comprises a first section 18, a second section 19 and a third section 20. The second section 19 is arranged between the first section 18 and the third section 20. The second section 19 is perpendicular to each of the first section 18 and the third section 20. The first section 18 and the third section 20 are parallel to each other. This design of the first section 18, the second section 19 and the third 20 section results in the Z-shaped cross section of the first part 7a of the first busbar 7.

The first section 18 of the first part 7a is part of the terminal 9 of the first busbar 7. The second section 19 of the first part 7a is arranged on the lateral face 6c of the stack 6. The third section 20 of the first part 7a is arranged on the bottom face 6b of the stack 6. The third section 20 comprises a pair of two protrusions 21 that are electrically and mechanically connected to the bottom face 2 of a winding element 1. In particular, the third section 20 comprises multiple pairs of two protrusions 21 that are electrically and mechanically connected to the bottom face 2 of every second winding element 1 in the stacking direction S.

The second part 7b of the first busbar 7 is designed analog to the first part 7a of the first busbar 7. In particular, the second part 7b also comprises a first section 18, a second section 19 and a third section 20. The second part 7b also has a Z-shaped cross-section.

The first section 18 of the second part 7b of the first busbar 7 is part of the terminal 9 of the first busbar 7. In particular, the terminal 9 is formed by the two first sections 18 of the first part 7a and of the second part 7b. The second section 19 of the second part 7b is perpendicular to the first section 18 and is arranged on the lateral face 6c of the stack 6. The third section 20 of the second part 7b is perpendicular to the second section 19 and is arranged on the top face 6a of the stack 6. The third section 20 comprises a pair of two protrusions 21 that are electrically and mechanically connected to the top face 3 of a winding element 1. In particular, the third section 20 comprises multiple pairs of two protrusions 21 that are electrically and mechanically connected to the top faces 2 of those winding element 1 which have a bottom face 2 that is not connected to the first part 7a.

The first and the second part 8a, 8b of the second busbar 8 are formed analog to the first and second part 7a, 7b of the first busbar 7 and are, therefore, not described in detail.

The first busbar 7 and the second busbar 8 completely overlap each other apart from the protrusions 21 that are connected to the tope face 3 or the bottom face 2 of the winding elements 1. Thus, the protrusions 21 are the only parts of the busbars 7, 8 wherein the electromagnetic flux of the two busbars 7, 8 is not compensated by the respective other busbar. Overall, this results in a very large compensation of the electromagnetic flus in the busbars 7, 8.

Each of the first busbar 7 and the second busbar 8 comprises multiple terminals 9. The terminals 9 are distributed symmetric with respect to the winding elements 1 along the first busbar 7 and the second busbar 8. The symmetric arrangement of the terminals 9 optimizes a current balance between the winding elements 1. A non-symmetric arrangement of the terminals 9 would result in an unbalanced current between the winding elements 1 and, thus, a reduced performance of the capacitor.

When an alternating current is applied to the terminals 9 of the first busbar 7 and the second busbar 8, the alternating current flows through each of the first part 7a and the second part 7b of the first busbar 7 and the first part 8a and the second part 8b of the second busbar 8.

The Z-shaped cross-section of each of the parts 7a, 7b, 8a, 8b of the busbars 7, 8 results in a large overlapping area of the busbars 7, 8. Thus, due to the large overlap, the parasitic inductances are very low, the parasitic resistances are very low and negative electromagnetic interactions can be avoided.

The first busbar 7 and the second busbar 8 are electrically connected to the middle points of the top face 3 or the bottom face 2 of the winding elements 1. The busbars 7, 8 can be adapted to the dimensions of the winding elements 1 and can, in particular, be dimensioned such that they are connected to the middle points of the top face 3 or, respectively, the bottom face 2 of the winding elements 1 independently of the dimensions of the winding elements 1. This increases the current capability and the allowed maximum winding size.

Figure 54:
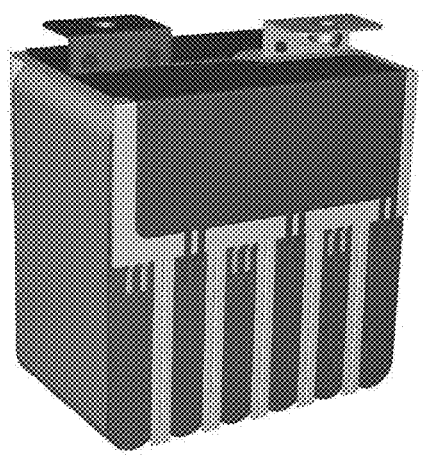
Figure 55:
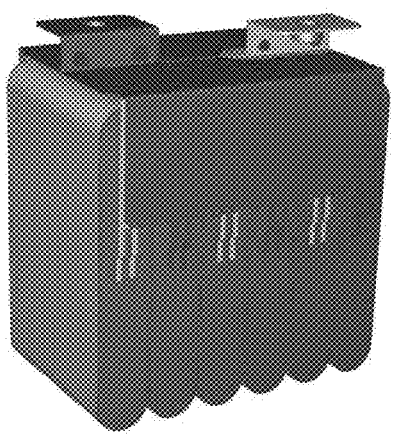
Figure 56:
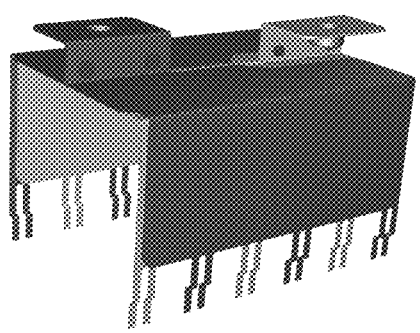
Figure 57:
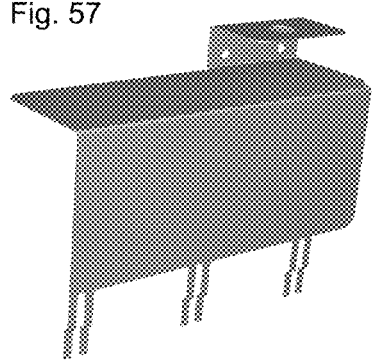
Figure 58:
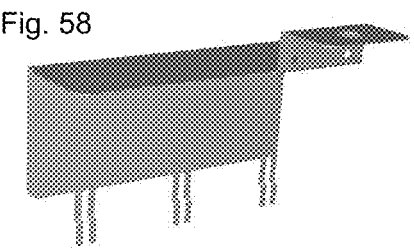
Figure 59:
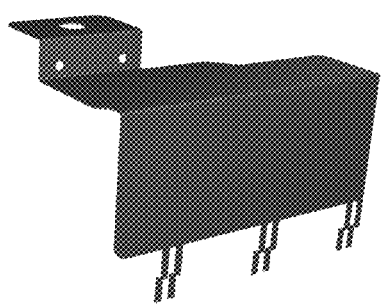
Figure 60:
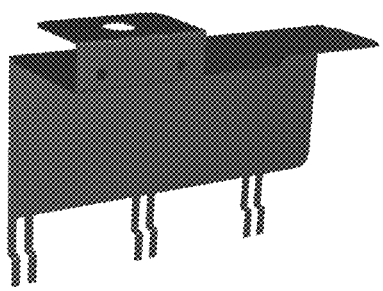
Figure 61:
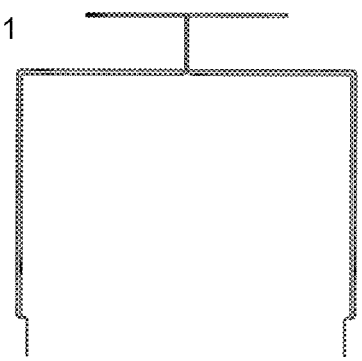

FIGS. 54 and 55 show a capacitor according to a fifteenth embodiment. FIG. 56 shows the busbars 7, 8 of the capacitor according to the fifteenth embodiment in a perspective view. FIG. 57 shows a first part 7a of the first busbar 7. A second part 7b of the first busbar 7 is shown in FIG. 58. A first part 8a of the second busbar 8 is shown in FIG. 59. A second part 8b of the second busbar 8 is shown in FIG. 60. FIG. 61 shows the first busbar 7 and the second busbar 8 in a cross-sectional view.

The capacitor of the fifteenth embodiment is substantially identical to the capacitor of the fourteenth embodiment and differs from the capacitor of the fourteenth embodiment only in the shape and the number of the terminals 9. According to the fifteenth embodiment, each of the first busbar 7 and the second busbar 8 has only one terminal 9. The terminal 9 is formed by a first section 18 of the first part 7a, 8a and a first section 18 of the second part 7b, 8b of the respective busbar 7, 8. The first sections 18 each comprise to subsections that are perpendicular to each other. Thereby, a bend terminal 9 is formed. The bend terminal 9 has a subsection that is perpendicular to the lateral face 6c of the stack 6 and a sub-section that is parallel to the lateral face 6c.

The capacitor of the fifteenth embodiment has the same advantages as the capacitor of the fourteenth embodiment resulting from a large overlap of the busbars 7, 8 and from the arrangement of the winding elements 1 with alternating polarity.

Figure 62:
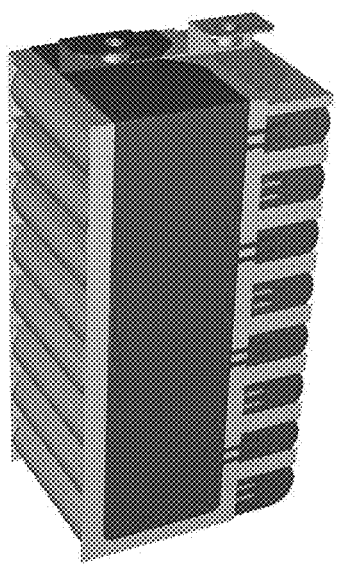
Figure 63:
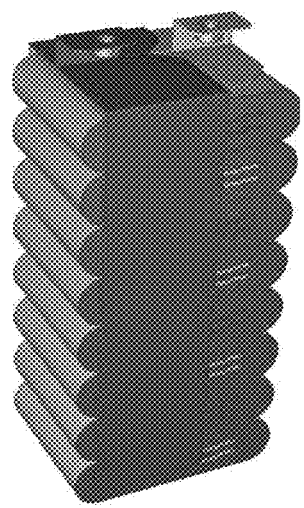
Figure 64:
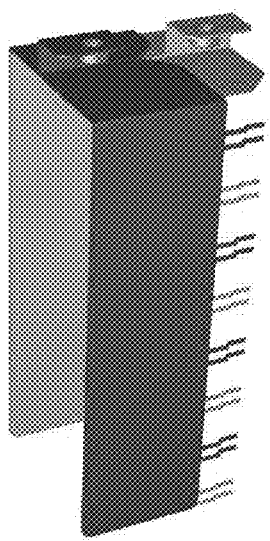
Figure 65:
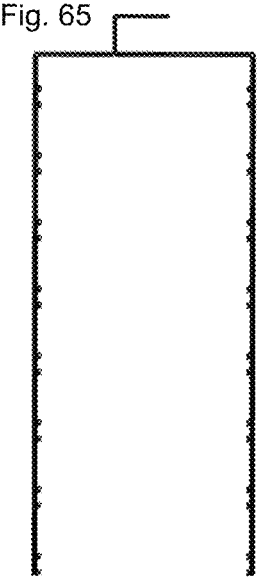
Figure 66:
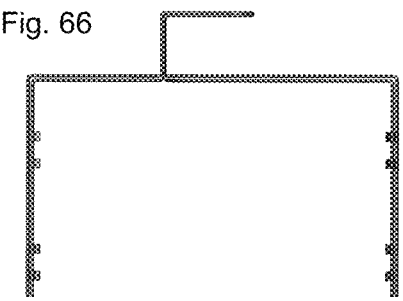
Figure 67:
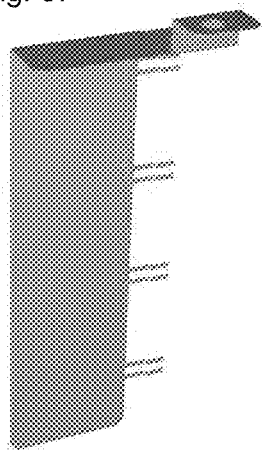
Figure 68:
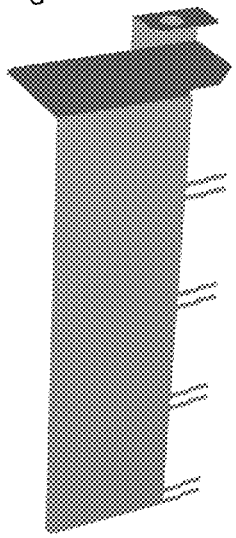
Figure 69:
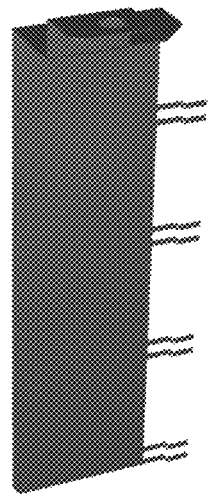
Figure 70:
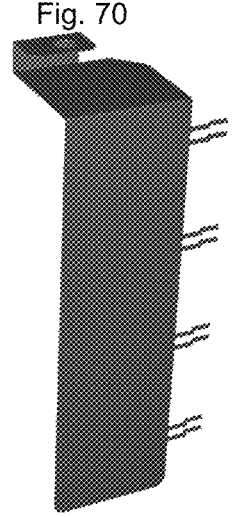

FIGS. 62 and 63 show a capacitor according to a sixteenth embodiment. FIG. 64 shows the busbars 7, 8 of the capacitor according to the sixteenth embodiment in a perspective view. FIG. 65 shows the busbars 7, 8 in a cross-sectional view. FIG. 66 shows an enlarged view of a part of FIG. 65. FIG. 67 shows a first part 7a of the first busbar 7. A second part 7b of the first busbar 7 is shown in FIG. 68. A first part 8a of the second busbar 8 is shown in FIG. 69. A second part 8b of the second busbar 8 is shown in FIG. 70.

The capacitor according to the sixteenth embodiment differs from the capacitor of the fifteenth embodiment in that the terminals 9 are arranged on the lateral face 6d. The surface normal of the lateral face 6d is parallel to the stacking direction S. In contrast to this, the terminals 9 of the capacitor of the fifteenth embodiment are arranged on the lateral face 6c wherein the surface normal of the lateral face 6c is perpendicular to the stacking direction S. The other features of the capacitor of the sixteenth embodiment are identical to the capacitor of the fifteenth embodiment. The capacitor of the sixteenth embodiment has the same advantages as the capacitor of the fourteenth embodiment and the capacitor of the fifteenth embodiment resulting from a large overlap of the busbars 7, 8 and from the arrangement of the winding elements 1 with alternating polarity.

Figure 71:
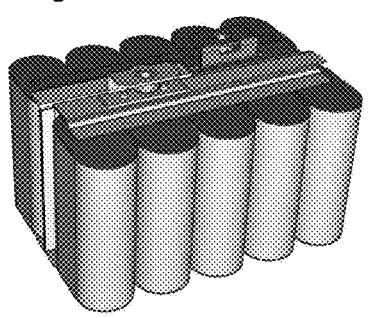
Figure 72:
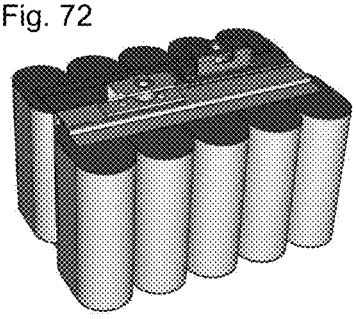
Figure 73:
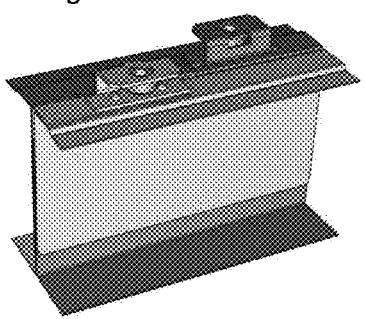
Figure 74:
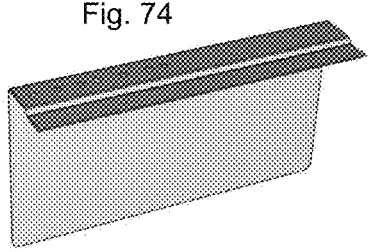
Figure 75:
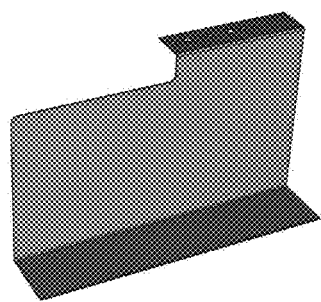
Figure 76:
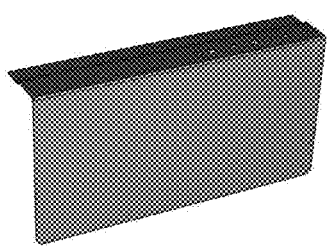
Figure 77:
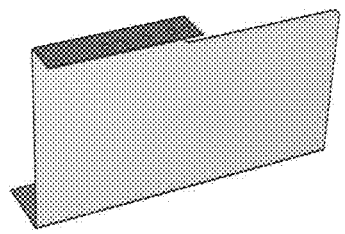
Figure 78:
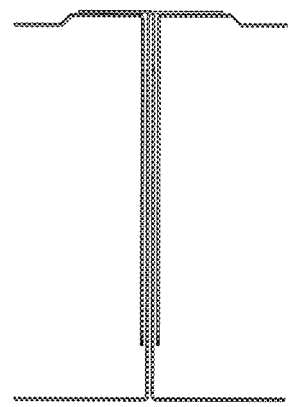

FIGS. 71 and 72 show a capacitor according to a seventeenth embodiment. FIG. 73 shows the busbars 7, 8 of the capacitor according to the seventeenth embodiment in a perspective view. FIG. 74 shows a first part 7a of the first busbar 7. A first part 8a of the second busbar 8 is shown in FIG. 75. A second part 8b of the second busbar 8 is shown in FIG. 76. A second part 7b of the first busbar 7 is shown in FIG. 77. FIG. 78 shows the busbars 7, 8 in a cross-sectional view.

The capacitor according to the seventeenth embodiment is similar to the capacitor of the twelfth embodiment and differs only in the design of the terminals 9. According to the seventeenth embodiment, the terminals 9 comprise a separate, hook-shaped element that is fixed to the busbars, e.g., by screwing. The hook-shaped element is electrically connected to the busbars 7, 8 and allows connecting the capacitor to further circuit elements.

The capacitor according to the seventeenth embodiment has four layers of overlapping busbars 7, 8 between the stacks 6, 13 of winding elements 1 such that the parasitic inductances are very low, the parasitic resistances are very low and negative electromagnetic interferences can be avoided. The busbars 7, 8 are connected to the middle points of the top face 3 or, respectively, the bottom face 2 of the winding elements 1, thus enabling a high current capability of the capacitor and the use of large winding elements.

Figure 79:
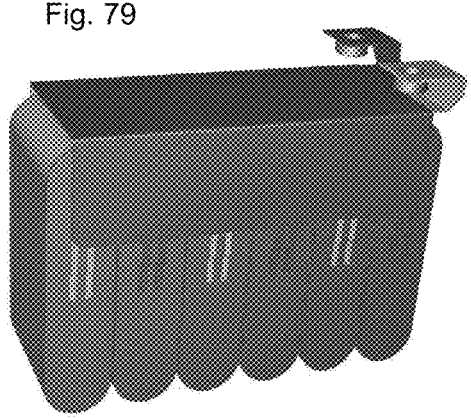
Figure 80:
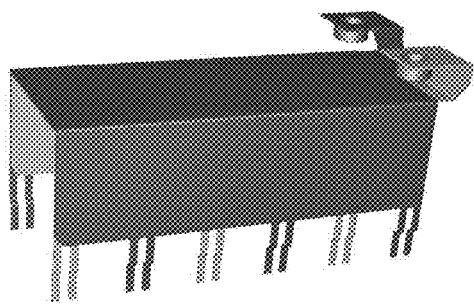
Figure 81:
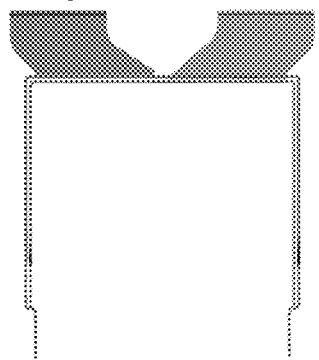

FIG. 79 shows a capacitor according to an eighteenth embodiment. FIG. 80 shows the busbars 7, 8 of the capacitor according to the eighteenth embodiment in a perspective view. FIG. 81 shows the busbars 7, 8 in a cross-sectional view.

Figure 82:
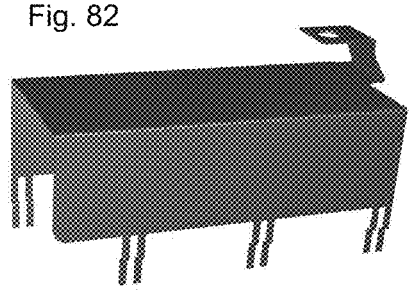
Figure 83:
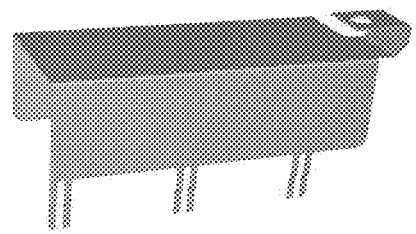

FIG. 82 shows the first busbar 7. FIG. 83 shows the second busbar 8.

The winding elements 1 are arranged in a single stack 6. Along the stacking direction S, the winding elements 1 are arranged such that their polarity alternates. Thus, each winding element 1 has an opposite polarity compared to its adjacent winding element 1. Due to the alternating winding polarities along the stacking directions S, parasitic inductances, the parasitic resistance and negative electromagnetic interactions are reduced compared to a capacitor wherein all winding elements 1 have the same polarities.

The capacitor comprises the first busbar 7 and the second busbar 8. Each busbar 7, 8 consists of one single piece or part. Thus, in contrast to the seventeenth embodiment, the busbars 7, 8 do not comprise multiple parts. Thus, the first busbar 7 is connected to each face of the winding elements 1 which has the first polarity and the second busbar 8 is connected to each face of the winding elements 1 which has the second polarity. As the busbars 7, 8 consist of a single piece, their design is simpler compared to busbars 7, 8 comprising multiple pieces.

When an AC current is applied to the terminals 9, the AC current flows through the entire busbars 7, 8.

The first busbar 7 and the second busbar 8 each have a U-shaped cross-section. In particular, they are arranged on the same faces of the stack 6 of winding elements 1 and overlap each other almost completely. Thus, the overlapping area of the two busbars 7, 8 is very large. Thus, the parasitic inductance and the parasitic resistance are low and negative electromagnetic interactions are avoided.

The busbars 7, 8 are connected to the middle point of the top face 3 of the winding elements 1 or, respectively, to the middle point of the bottom face 2 of the winding elements 1. This design of the busbars 7, 8 results in a capacitor having a large current capability. Moreover, the busbars 7, 8 can be adapted to a wide range of winding elements 1, thereby allowing for a large maximum size of the winding elements 1.

The first and the second busbar 7, 8 overlap with each other and the AC current flows in the busbars 7, 8 in opposite directions. Thus, the electromagnetic flux generated by the busbars 7, 8 cancels each other. This reduces parasitic inductances, parasitic resistances and negative electromagnetic interferences. Electromagnetic flux cancellation can be assured till the connection to the winding elements 1.

Figure 84:
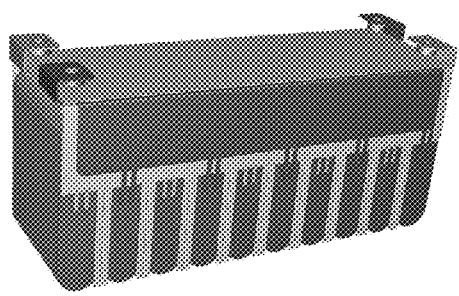
Figure 85:
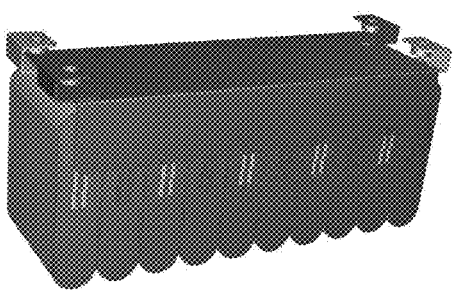
Figure 87:
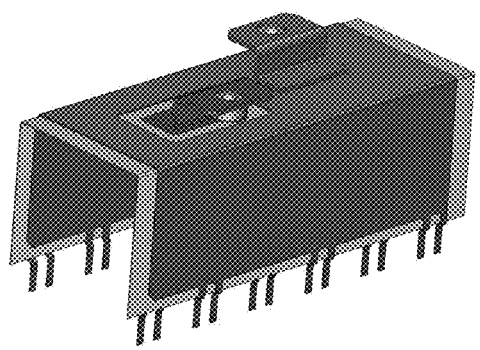

FIGS. 84 and 85 show a capacitor according to a nineteenth embodiment in a perspective view, wherein in FIG. 87 the isolator plates are not shown for visualization purposes. Compared to the eighteenth embodiment, the capacitor of the nineteenth embodiment comprises two additional terminals. Each of the first busbar 7 and the second busbar 8 has two terminals 9. In the stacking direction S, a first pair of terminals 9 is arranged at one end of the capacitor and a second pair of terminals 9 is arranged at the opposite end of the capacitor. This arrangement of the terminals 9 is optimized for the use of the capacitor in a back-to-back converter. The same capacitor can be connected to an inverter side and to a rectifier side.

The capacitor of the nineteenth embodiment has the same advantages as previously discussed with respect to the capacitor of the eighteenth embodiment.

Figure 86:
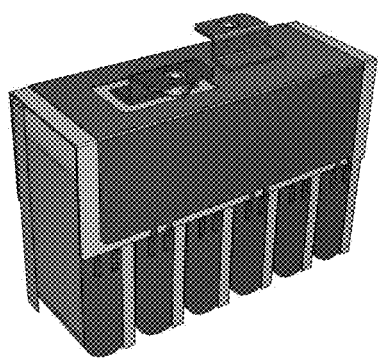

FIG. 86 shows a capacitor of a twentieth embodiment and FIG. 87 shows the busbars 7, 8 of the capacitor of the twentieth embodiment. The capacitor of the twentieth embodiment differs from the capacitor of the eighteenth embodiment in the arrangement of the terminals 9. According to the twentieth embodiment, each of the first busbar 7 and the second busbar 8 comprises one terminal 9 wherein the terminal 9 is arranged centrally on the busbar 7, 8. The capacitor of the twentieth embodiment has the same advantages as previously discussed with respect to the capacitor of the eighteenth embodiment.

Figure 88:
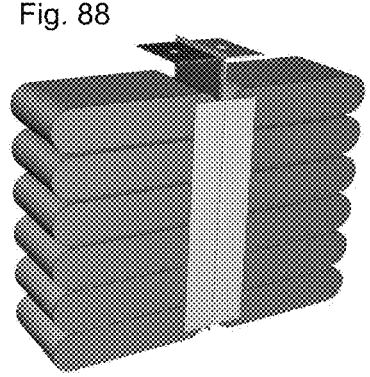
Figure 89:
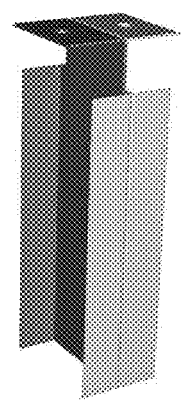
Figure 90:
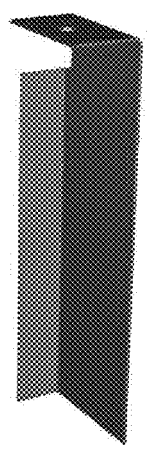
Figure 91:
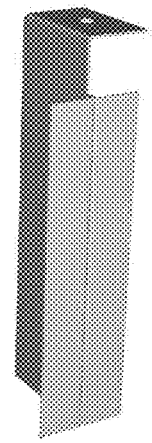
Figure 92:
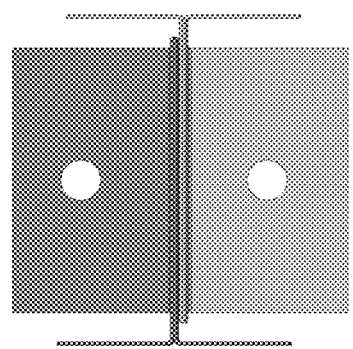

FIG. 88 shows a capacitor according to a twenty-first embodiment in a perspective view. FIGS. 89 to 92 show the busbars 7, 8 of the capacitor of the twenty-first embodiment.

The capacitor comprises a first stack 6 of winding elements 1 and a second stack 13 of winding elements 1. The winding elements 1 in the first stack 6 all have the same polarity and the winding elements 1 in the second stack 13 also all have the same polarity.

The busbars 7, 8 are arranged between the stacks 6, 13. Between the stacks 6, 13, the busbars 7, 8 overlap each other. Each of the first busbar 7 and the second busbar 8 has a double-L shape and is folded by 180° in its middle. The position of the folding 22 is marked in FIG. 92. Each of the first busbar 7 and the second busbar 8 comprises sections that are arranged between the stacks 6, 13 and sections that overlap with the top faces 3 or the bottom faces 2 of the winding elements 1. Due to the folding 22 of the busbars 7, 8, the busbars 7, 8 have a larger thickness in the sections between the stacks 6, 13 than in the sections overlapping with the top or bottom faces 2, 3. The increased thickness between the stacks 6, 13 results in a large current capability between the stacks 6, 13. As the busbars 7, 8 are thinner at the top or bottom faces 2, 3 of the winding elements 1, it is easy to fix the busbars 7, 8 to the winding elements 1 by welding.

No extra or separate connection elements between the winding elements 1 and the busbars 7, 8 are required. The busbars 7, 8 are fixed to the winding elements 1 directly, e.g., by welding or soldering. This reduces parasitic inductances, parasitic resistances and avoids negative electromagnetic interactions compared to a capacitor comprising separate connection elements.

As discussed above with respect to previous embodiments, the busbars 7, 8 are connected to the middle points of the top face 3 or, respectively, the bottom face 2 of the winding elements 1.

As the polarity of both stacks 6, 13 is not opposite, it is not required to interlace the connections between the busbars 7, 8 and the winding elements 1. Thus, a simple solution can be obtained.

Figure 93:
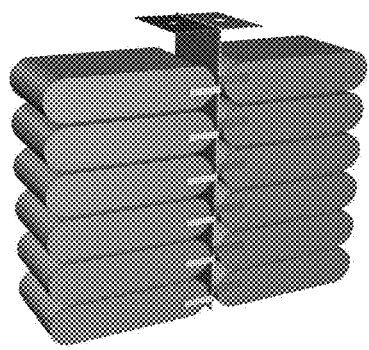
Figure 94:
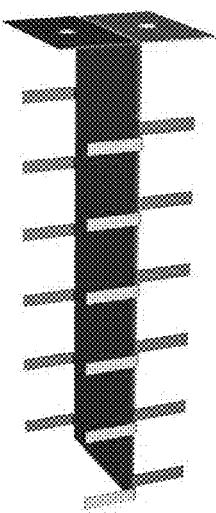
Figure 95:
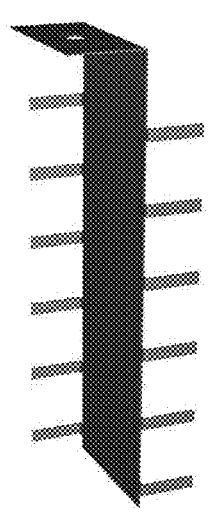
Figure 96:
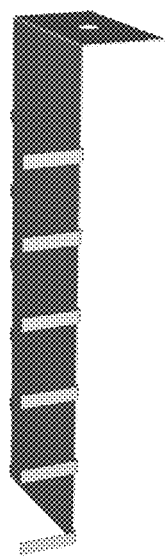

FIG. 93 shows a capacitor according to a twenty-second embodiment in a perspective view. FIGS. 94 to 96 show the busbars 7, 8 of the capacitor according to the twenty-second embodiment.

The capacitor of the twenty-second embodiment is similar to the capacitor of the sixth embodiment shown in FIGS. 19 and 20. The capacitor comprises two stacks 6, 13, each stack 6, 13 consisting of a plurality of winding elements 1. The winding elements 1 in the first stack 6 are arranged such that they are inverted in their polarity compared to the adjacent winding elements 1 in the second stack 13. In particular, the top face 3 of the winding elements 1 of the first stack 6 corresponds to the first pole and the top face 3 of the winding elements 1 of the second stack 13 corresponds to the second pole.

The design of the busbars 7, 8 of the capacitor of the twenty-second embodiment is different the capacitor of the sixth embodiment. The busbars 7, 8 are arranged between the stacks 6, 13 and comprise protrusions 21 overlapping the top face 3 or the bottom face 2 of the winding elements 1. The busbars 7, 8 are connected directly to the winding elements 1, e.g., by soldering or welding. The capacitor has a low parasitic inductance, a low parasitic resistance and negative electromagnetic interactions are avoided.

Figure 97:
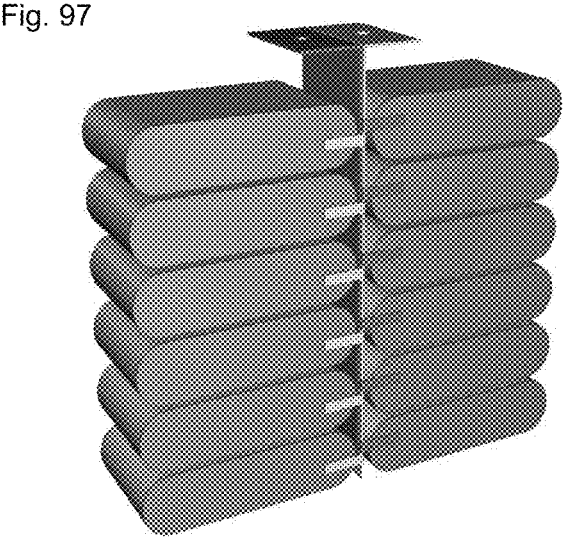
Figure 98:
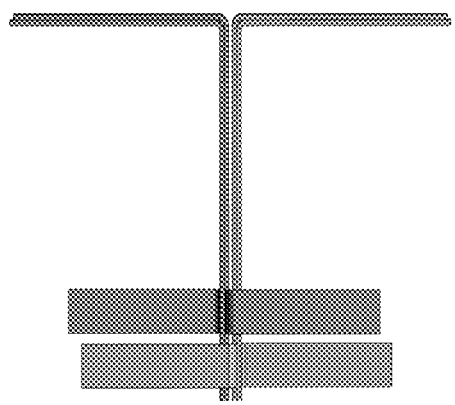

FIG. 97 shows a capacitor according to a twenty-third embodiment in a perspective view. FIG. 98 shows an enlarged view of a part of the first busbar and the second busbar.

The capacitor according to the twenty-third embodiment is similar to the capacitor of the twenty-second embodiment. In contrast to the twenty-second embodiment, the first busbar 7 and the second busbar 8 have a larger thickness in sections that are arranged between the two stacks 6, 13 than in sections that overlap the top face 3 or the bottom face 2 of a winding element 1. This larger thickness is achieved by folding each of the busbars 7, 8 in the sections between the stacks 6, 13.

The current capability is high due to the large thickness of the busbars 7, 8 between the stacks 6, 13. A welding process is easy as the sections of the busbars 7, 8 that overlap the top face 3 or the bottom face 2 of the winding elements 1 have a low thickness.

The busbars 7, 8 can be connected to the winding elements 1 directly, i.e., without extra connection elements, e.g., by welding or soldering. Thereby, it is ensured that parasitic inductances are low, parasitic resistance is low and negative electromagnetic interaction is avoided.

For all the embodiments described above, the quantity of the winding elements 1 per capacitor can be varied. The shape and the dimensions of the winding elements 1 can also be varied in all of the above described embodiments. The terminal 9 layout can also be varied in each of the embodiments.

We claim:

1. A capacitor comprising:
at least two winding elements arranged in a stack;
a first busbar;
a second busbar,
wherein the first busbar and the second busbar connect the winding elements in parallel to each other, and wherein the first busbar and the second busbar are arranged such that they overlap each other; and
a fifth busbar and a sixth busbar,
wherein the first busbar and the second busbar are arranged on a first side of the stack and the fifth and the sixth busbar are arranged on a second side of the stack opposite to the first side,
wherein the fifth busbar is connected to the same poles as the first busbar and the sixth busbar is connected to the same poles as the second busbar,
wherein the first busbar and the fifth busbar are connected to one pole of each of the winding elements at two positions being symmetric with respect to each other, and
wherein the second busbar and sixth busbar are connected to the other pole of each of the winding elements at two positions being symmetric with respect to each other.

2. The capacitor according to claim 1, wherein the first busbar and the second busbar are arranged such that at least 50% of an area of the first busbar is overlapped by the second busbar.

3. The capacitor according to claim 1, wherein the first busbar and the second busbar are arranged such that when a current flows through the first busbar it generates a first magnetic field and when a current flows through the second busbar it generates a second magnetic field, and wherein the first magnetic field and the second magnetic field compensate each other.

4. The capacitor according to claim 1, wherein each winding element has a positive pole and a negative pole, wherein the first busbar is connected either to the positive pole of each winding element or to the negative pole of each winding element, and wherein the second busbar is connected to the respective other of the positive pole of each winding element or the negative pole of each winding element.

5. The capacitor according to claim 1,
wherein, in a stacking direction, the first busbar is alternatingly connected to a top face of one winding element and to a bottom face of the next winding element, and
wherein, in the stacking direction, the second busbar is alternatingly connected to a bottom face of one winding element and to a top face of the next winding element.

6. The capacitor according to the claim 1,
wherein the first busbar is connected to a top face of each of the winding elements, and
wherein the second busbar is connected to a bottom face of each of the winding elements.

7. The capacitor according to claim 1, wherein the first busbar and the second busbar are arranged at a lateral face of the stack.

8. The capacitor according to claim 1, wherein the first and the second busbar are arranged on a lateral side of the stack which has a surface normal perpendicular to a stacking direction of the stack, and wherein the fifth busbar and the sixth busbar are arranged on a lateral side opposite to the lateral side on which the first and the second busbar are arranged and which also has a surface normal perpendicular to the stacking direction.

9. The capacitor according to claim 1, wherein the first busbar and the second busbar are arranged on at least two faces of the stack.

10. The capacitor according to claim 1, wherein the capacitor comprises at least four winding elements, and wherein at least two winding elements are arranged in a first stack and at least two winding elements are arranged in a second stack.

11. The capacitor according to claim 1, wherein the first busbar and the second busbar are arranged between the first stack and the second stack.

12. The capacitor according to claim 11,
wherein the first busbar has a larger thickness in a section between the stacks than in a section overlapping a top face or a bottom face of the winding elements, and/or
wherein the second busbar has a larger thickness in a section between the stacks than in a section overlapping a top face or a bottom face of the winding elements.

13. The capacitor according to claim 12,
wherein the first busbar is folded in the section between the stacks, and/or
wherein the second busbar is folded in the section between the stacks.

14. The capacitor according to claim 10, wherein the winding elements are arranged in the first stack and, respectively, in the second stack such that a top face of the first stack has a polarity opposite to the polarity of a top face of the second stack.

15. The capacitor according to claim 14,
wherein the first busbar is connected to the top faces of the winding elements in the first stack and to bottom faces of the winding elements in the second stack, and
wherein the second busbar is connected to bottom faces of the winding elements in the first stack and to the top faces of the winding elements in the second stack.

16. The capacitor according to claim 13,
wherein the first busbar is arranged on the top face of the first stack and on the top face of the second stack and is electrically connected to the top face of the first stack,
wherein the second busbar is arranged on the top face of the first stack and on the top face of the second stack and is electrically connected to the top faces of the second stack,
wherein the capacitor further comprises a third busbar and a fourth busbar,
wherein the third busbar is arranged on the bottom face of the first stack and on the bottom face of the second stack and is electrically connected to the bottom face of the first stack,
wherein the fourth busbar is arranged on the bottom face of the first stack and on the bottom face of the second stack and is electrically connected to the bottom face of the second stack, and
wherein the third busbar and the fourth busbar overlap each other.

17. The capacitor according to claim 13, further comprising a third busbar and a fourth busbar, wherein each of the first, the second, the third and the fourth busbars is arranged between the first stack and the second stack, and wherein the busbars are connected to the winding elements such that a current flows in adjacent busbars in opposite directions.

18. The capacitor according to claim 17,
wherein the first busbar is connected to the top faces of the winding elements in the first stack having a first polarity,
wherein the second busbar is connected to the top faces of the winding elements in the second stack having a second polarity opposite to the first polarity,
wherein the third busbar is connected to the bottom faces of the winding elements in the second stack having the first polarity, and
wherein the fourth busbar is connected to the bottom faces of the winding elements in the first stack having the second polarity.

19. The capacitor according to claim 1, wherein the first busbar comprises two parts and/or wherein the second busbar comprises two parts.

20. The capacitor according to claim 19, wherein each of the parts has a Z-shaped cross-section.

21. The capacitor according to claim 1,
wherein the first busbar is connected to the winding elements directly by welding or soldering, and
wherein the second busbar is connected to the winding elements directly by welding or soldering.

22. The capacitor according to claim 1, wherein the first busbar is formed such that it contacts two connection elements on a top face of each winding element, wherein the second busbar is formed such that it contacts two connection elements on a bottom face of each winding element, and wherein the first and the second busbar each cover three lateral faces of a stack and the first busbar partly covers the top face of the stack and the second busbar partly covers the bottom face of the stack.

23. The capacitor according to claim 1, wherein the capacitor comprises at least four winding elements, wherein at least two winding elements are arranged in a first stack and at least two winding elements are arranged in a second stack, wherein the winding elements are arranged in the first stack and, respectively, in the second stack such that a top face of the first stack has a polarity opposite to the polarity of a top face of the second stack, wherein each of the first and the second busbar has a z-shaped cross-section, wherein the first busbar and the second busbar are arranged between the first stack and the second stack, and wherein each of the first busbar and the second busbar partly covers the top face of the first stack and partly covers a bottom face of the second stack.

24. The capacitor according to claim 1, wherein the winding elements have a non-circular diameter.

25. The capacitor according to claim 1, wherein the capacitor is a DC link capacitor.

26. A capacitor comprising:
at least two winding elements;
a first busbar; and
a second busbar,
wherein the first busbar and the second busbar connect the winding elements in parallel to each other,
wherein the first busbar and the second busbar are arranged such that they overlap each other in an overlap area,
wherein the at least two winding element are arranged in one or more stacks, each stack comprising at least two winding elements which are stacked on each other in a stacking direction,
wherein the stacking direction is parallel to the overlap area,
wherein each winding element comprises at least one connection element on a top face which is contacted to one of the first busbar or the second busbar,
wherein a distance between the connection elements of two winding elements, which are adjacent to each other in one stack, is equal or lower than an elongation of the winding elements in their smallest dimension,
wherein a minimum distance from the overlap area to the respective connection element is equal for all of the connection elements, and
wherein the minimum distance from the overlap area to the respective connection element is lower than half of an elongation of the winding elements in their smallest dimension.

27. A capacitor comprising:
at least four winding elements;
a first busbar; and
a second busbar,
wherein the first busbar and the second busbar connect the winding elements in parallel to each other,
wherein the first busbar and the second busbar are arranged such that they overlap each other,
wherein at least two winding elements are arranged in a first stack and at least two winding elements are arranged in a second stack,
wherein the first busbar and the second busbar are arranged between the first stack and the second stack,
wherein the first busbar has a larger thickness in a section between the stacks than in a section overlapping a top face or a bottom face of the winding elements, and/or wherein the second busbar has a larger thickness in a section between the stacks than in a section overlapping a top face or a bottom face of the winding elements, and wherein the first busbar is folded in the section between the stacks, and/or wherein the second busbar is folded in the section between the stacks.

28. A capacitor comprising:

at least two winding elements;

a first busbar; and a second busbar, wherein the first busbar and the second busbar connect the winding elements in parallel to each other, wherein the first busbar and the second busbar are arranged such that they overlap each other, wherein the first busbar is formed such that it contacts two connection elements on a top face of each winding element, wherein the second busbar is formed such that it contacts two connection elements on a bottom face of each winding element, and wherein the first and the second busbar each cover three lateral faces of a stack and the first busbar partly covers the top face of the stack and the second busbar partly covers the bottom face of the stack.

* * * * *